US012112658B2

(12) United States Patent
Shea

(10) Patent No.: US 12,112,658 B2
(45) Date of Patent: Oct. 8, 2024

(54) SIGNAGE SYSTEMS AND MERCHANDISING DISPLAY ASSEMBLIES

(71) Applicant: T.M. Shea Products, Inc., Troy, MI (US)

(72) Inventor: Thomas M. Shea, Troy, MI (US)

(73) Assignee: T.M. Shea Products, Inc., Troy, MI (US)

( * ) Notice: Subject to any disclaimer, the term of this patent is extended or adjusted under 35 U.S.C. 154(b) by 52 days.

(21) Appl. No.: 17/899,995

(22) Filed: Aug. 31, 2022

(65) Prior Publication Data

US 2023/0335019 A1 Oct. 19, 2023

Related U.S. Application Data

(60) Provisional application No. 63/331,540, filed on Apr. 15, 2022.

(51) Int. Cl.

| | |
|---|---|
| ***G09F 3/20*** | (2006.01) |
| ***A47F 5/08*** | (2006.01) |
| ***G09F 7/18*** | (2006.01) |

(52) U.S. Cl.

CPC ............ *G09F 3/204* (2013.01); *A47F 5/0807* (2013.01); *G09F 7/18* (2013.01); *G09F 2007/1856* (2013.01)

(58) Field of Classification Search

CPC .... G09F 3/204; G09F 7/18; G09F 2007/1856; A47F 5/0807

USPC .................................................... 248/220.43

See application file for complete search history.

(56) References Cited

U.S. PATENT DOCUMENTS

| | | | | | |
|---|---|---|---|---|---|
| 6,070,747 | A * | 6/2000 | Shea | A47F 5/0807 248/220.31 |
| 6,199,706 | B1 * | 3/2001 | Shea | A47F 5/0807 248/220.42 |
| D459,132 | S * | 6/2002 | Shea | D6/567 |
| D459,626 | S * | 7/2002 | Shea | D6/567 |
| D465,371 | S * | 11/2002 | Shea | D6/567 |
| D466,352 | S * | 12/2002 | Shea | D6/567 |
| D467,114 | S * | 12/2002 | Shea | D6/566 |
| 6,502,706 | B1 * | 1/2003 | Kent | A47F 5/0823 248/220.42 |
| D654,727 | S * | 2/2012 | Shea | D6/682.2 |
| D657,975 | S * | 4/2012 | Shea | D6/674 |
| 9,591,932 | B2 * | 3/2017 | Lachance | A47B 97/001 |
| 10,971,038 | B2 * | 4/2021 | Shea | G09F 7/08 |
| 11,044,994 | B2 * | 6/2021 | Heap | A47B 57/425 |

(Continued)

*Primary Examiner* — David R Dunn
*Assistant Examiner* — Christopher E Veraa
(74) *Attorney, Agent, or Firm* — Harness, Dickey & Pierce, P.L.C.; Stephen T. Olson

(57) ABSTRACT

A merchandise assembly for the retail display of goods in combination with a gondola system displaying a plurality of greeting cards includes a generally planar member, a plurality of merchandising support members, and a mounting arm. The generally planar member is constructed to include a front side and a rear side. The merchandising support members extend from at least one of the front and rear sides of the panel. The mounting arm connects the generally planar member with the gondola system. The general planar member is positioned forward of the plurality of greeting cards displayed by the gondola system and the mounting arm extends rearwardly from the generally planar member to the gondola system.

4 Claims, 32 Drawing Sheets

(56) References Cited

U.S. PATENT DOCUMENTS

| | | | | |
|---|---|---|---|---|
| 11,089,870 | B2 * | 8/2021 | Watkins | A47B 88/407 |
| 11,291,314 | B2 * | 4/2022 | Wengerd | A47F 5/0006 |
| 2002/0175132 | A1 * | 11/2002 | Shea | A47F 5/0006 211/113 |
| 2003/0164432 | A1 * | 9/2003 | Shea | A47F 5/0807 248/220.31 |
| 2005/0098518 | A1 * | 5/2005 | Shea | A47F 5/0807 211/94.01 |
| 2005/0109719 | A1 * | 5/2005 | Shea | A47F 5/0006 211/59.1 |
| 2005/0241201 | A1 * | 11/2005 | Lindquist | G09F 7/22 40/642.02 |
| 2005/0258121 | A1 * | 11/2005 | Shea | A47F 5/0807 211/195 |
| 2006/0213851 | A1 * | 9/2006 | Grueneberg | A47F 5/11 211/94.01 |
| 2006/0283818 | A1 * | 12/2006 | Shea | A47F 5/0838 211/59.1 |
| 2007/0125009 | A1 * | 6/2007 | Belokin | G09F 7/18 52/39 |
| 2007/0278163 | A1 * | 12/2007 | Barkdoll | A47F 5/0807 211/59.1 |
| 2008/0141575 | A1 * | 6/2008 | Keating | G09F 3/204 40/661.11 |
| 2012/0085713 | A1 * | 4/2012 | Bowser | A47F 5/0807 211/26 |
| 2015/0068990 | A1 * | 3/2015 | Shea | A47F 5/0815 211/106 |
| 2018/0064265 | A1 * | 3/2018 | Shea | A47F 5/0869 |

* cited by examiner

SIGNAGE SYSTEMS AND MERCHANDISING DISPLAY ASSEMBLIES

FIELD

The present teachings generally relate to retail signage systems and merchandising display assemblies.

DISCUSSION

A multitude of product and product categories crowd the aisles and merchandise displays of retail stores. Signage systems can be used to showcase products or product categories, attract attention and provide guidance to different sections of the store. For example, various signage systems are shown and described in commonly owned U.S. Publication No. 2012/0240436, U.S. Publication No. 2012/0240436 is incorporated by reference as if fully disclosed herein.

Merchandising display assemblies can be used to more effectively position merchandise within the store. For example, one known merchandise display assembly is shown and described in commonly owned U.S. Pat. No. 5,957,422. U.S. Pat. No. 5,957,422 is incorporated by reference as if fully disclosed herein.

While existing signage systems and merchandising display assemblies have proven to be satisfactory for their intended purposes, there remains a need for continuous improvement within the relevant art.

SUMMARY OF THE INVENTION

In accordance with one particular form, the present teachings provide a merchandise assembly for the retail display of goods. The merchandising assembly includes a generally planar member and a merchandising support member. The generally planar member is constructed to include a front side, and a rear side and defining a plurality of openings extending therethrough, each opening of the plurality of openings having a rectangular shape. The merchandising support member is suspended by the generally planar member and is constructed to include a mounting portion and first and second arms extending in opposite directions from the mounting portion. The mounting portion has an inverted U-shape opening in a downward direction. The mounting portion includes an upwardly extending nib at a centerline thereof. The merchandising support member passes through a first opening of the plurality of openings such that a first support member leg of the merchandising support member is adjacent the front side of the generally planar member and a second support member leg of the merchandising support member is adjacent the rear side of the generally planar member. The mounting portion includes first and second downwardly extending legs both having a leg thickness that is less that a vertical height of the slots of the generally planar member and a width in a perpendicular direction that is less that a horizontal width of the slots and the mounting portion includes a thickness in a vertical direction at the nib that is nominally greater than a vertical height of the slots such that the mounting portion at the nib vertically fills a gap of the corresponding opening in the panel upon insertion of the merchandising support member, engages the opening in an interference fit, and thereby holds the merchandising support member in place relative to the panel.

In accordance with another aspect, the present teachings provide a merchandise assembly for the retail display of goods including a generally planar member, a plurality of merchandising support members, and a mounting arm. The generally planar member includes a front side and a rear side. The plurality of merchandising support members extends from at least one of the front and rear sides of the panel. The mounting arm includes a proximal end having a plurality of engagement members for engaging a corresponding plurality of openings in an upright of the gondola. The plurality of engagement members includes a first engagement member having a T-shape with a first leg extending rearwardly from the remainder of the mounting arm and a second leg perpendicular to the first leg. The second leg extends in both upward and downward directions from the first leg. The plurality of engagement members further includes second and third engagement members that are L-shaped engagement members including a first leg extending rearwardly from the remainder of the mounting arm and a second leg perpendicular to the first leg. The second leg extends in the downward direction from the first leg.

In accordance with another aspect, the present teachings provide a merchandise assembly for the retail display of goods in combination with a gondola system displaying a plurality of greeting cards. The merchandising assembly includes a generally planar member, a plurality of merchandising support members, and a mounting arm. The generally planar member is constructed to include a front side and a rear side. The merchandising support members extend from at least one of the front and rear sides of the panel. The mounting arm connects the generally planar member with the gondola system. The general planar member is positioned forward of the plurality of greeting cards displayed by the gondola system and the mounting arm extends rearwardly from the generally planar member to the gondola system.

BRIEF DESCRIPTION OF THE DRAWINGS

The present invention will become more fully understood from the detailed description and the accompanying drawings, wherein.

DESCRIPTION OF VARIOUS ASPECTS

The following description is merely exemplary in nature and is in no way intended to limit the invention, its application, or uses.

Figure 1:
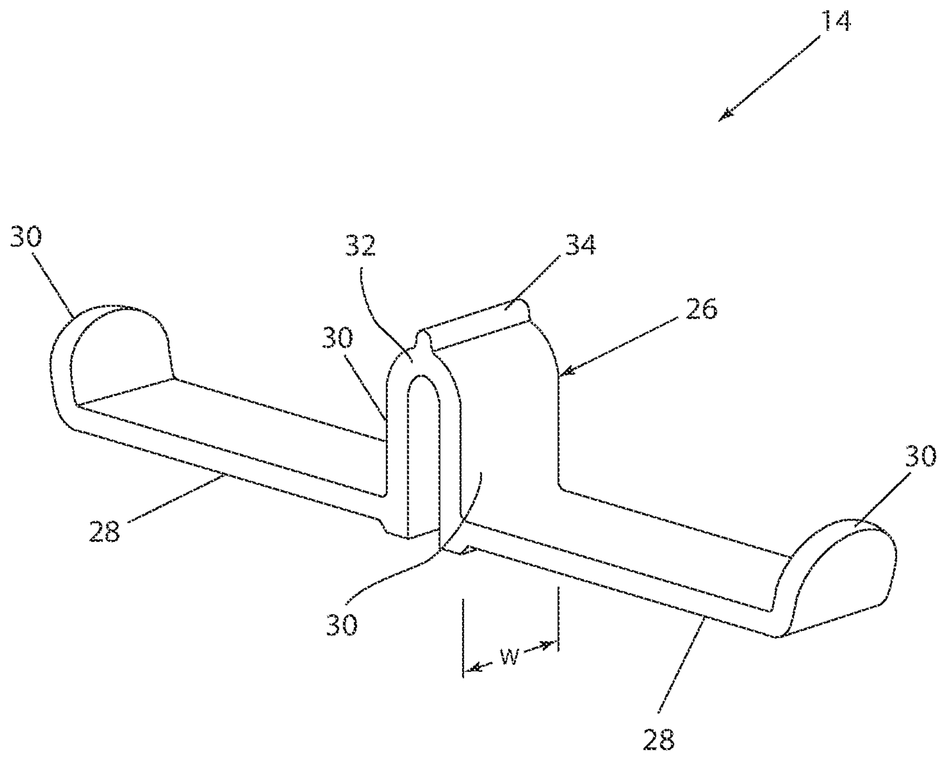
FIG. 1 is a perspective view of a hook for a merchandise display assembly in accordance with the present teachings.
Figure 2:
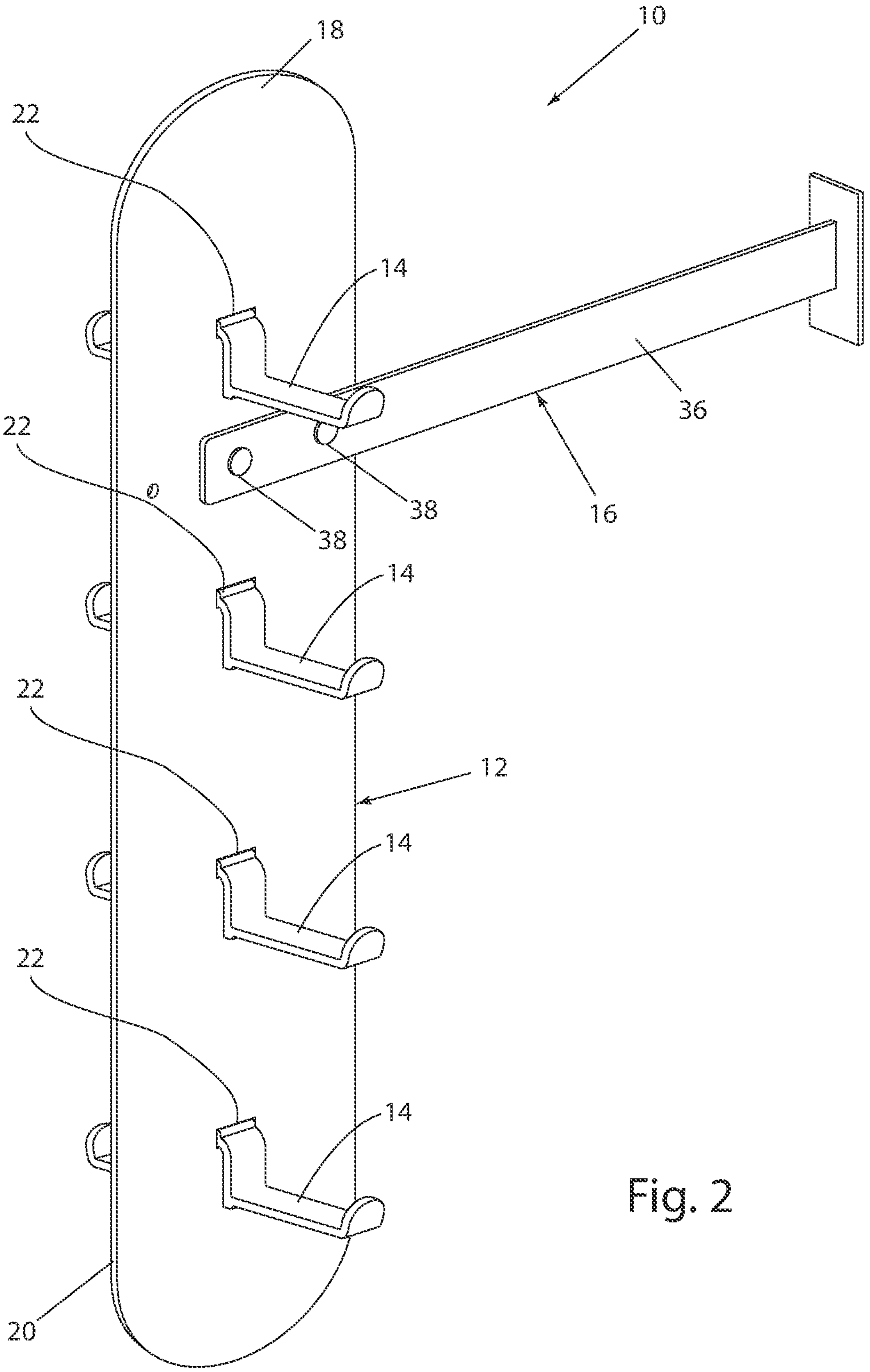
FIG. 2 is a perspective view of merchandise display assembly in accordance with the present teachings incorporating a plurality of the hooks of FIG. 1, the mounting arm adaptable to mount to various conventional structures.

With initial reference to FIGS. 1 and 2, a merchandising display assembly constructed in accordance with the present teachings is illustrated and generally identified at reference character 10. The merchandising display assembly 10 is generally illustrated to include a panel or generally planar member 12 and a plurality of merchandising support members 14. The merchandising display assembly 10 is illustrated to further include a mounting member 16.

The generally planar member 12 includes a front planar face 18 and a rear planar face 20. In the particular embodiment illustrated, the generally planar member 12 is preferably constructed of a corrugated plastic material, paperboard or other suitable material, the purpose of which is to provide rigidity and deflection resistant support to the generally planar member 12. The generally planar member 12 is formed to include a plurality of apertures 22. The apertures 22 are formed at selected locations along the height of the generally planar member 12 and extend through both the front and rear planar faces 18 and 20. As shown, each of the apertures 22 may have the general shape of a rectangle with a long axis oriented horizontally. The size and shape of the apertures 22 are intended to functionally receive and retain the merchandising support members 14. In the embodiment illustrated, the generally planar member 12 is shown to include four (4) apertures 22. It will be understood, however, that a greater or lesser number of apertures 22 may be incorporated within the scope of the present teachings.

With particular reference to FIG. 1, one of the merchandising support members 14 is illustrated and will be further described. It will be understood that the merchandising support members 14 are generally identical but may alternatively be different. The merchandising support member 14 is generally illustrated to include a mounting portion 26 and a pair of support arms 28. It will be understood that the mounting portion 26 and the pair of support arms 28 are monolithically formed of a common material. In the embodiment illustrated, the mounting portion 26 and the pair of support arms 28 are formed of a plastic or other suitable material. The merchandising support member 14 is sufficiently rigid so that the support arms 28 may suspend typical merchandise. In the embodiment illustrated, the merchandising support member 14 is a mirror image about a lateral centerline.

In side view, the mounting portion 26 has the shape generally of an inverted U. In this regard, the mounting portion 26 opens in a downward direction. The arms 28 extend outwardly from the mounting portion 26 in a generally horizontal direction. At their terminal ends, the arms 28 include and upwardly turned section 30 for retaining product thereon.

The U-shaped portion 26 of the merchandising support member 14 includes first and second downwardly extending legs 30 and a central arcuate portion 32 connecting the first and second downwardly extending legs 30. The U-shaped portion 26 may be further formed to include an upwardly extending nib 34 at a lateral center thereof. The first and second legs 30 have a thickness that is less that a vertical height of the slots 22 of the generally planar member 12 and a width W that is less that a horizontal width of the slots 22. The U-shaped portion 26 includes a thickness in a vertical direction at the nib 34 that is nominally greater than the vertical height of the slots 22.

The merchandising support members 14 are attached to the generally planar member 12 by inserting one of the support arms 28 through a corresponding one of the apertures 22. The nib 34 of the U-shaped portion 26 is shaped to engage the panel 12 upon insertion into one of the openings 22 in a tolerance fit. Because U-shaped portion 26 at the nib 34 has a dimension in a vertical direction that is equal to or slightly greater than a corresponding dimension of the opening 22 in a vertical direction, the U-shaped portion 26 at the nib 34 vertically fills the gap of the corresponding opening 22 in the panel 12 upon insertion of the merchandising support member 14 and thereby holds the merchandising support member 14 in place relative to the panel 12.

The mounting member 16 may include a mounting arm 36 may be attached to the panel 12 with rivets 38, with other fasteners, or may be glued to the panel 12. An opposite end of the mounting arm 36 may be secured to a gondola or other structure in any manner well known in the art. Alternatively, the panel 12 may be suspended from a hook (not shown).

Turning to FIG. 3 and FIGS. 3A-3C, another merchandise display assembly in accordance with the present teachings is illustrated and identified at reference character 100. The merchandise display assembly 100 is illustrated to include a panel 102, a plurality of hooks or merchandising support members 104, and a mounting member or mounting arm 106. The mounting arm 106 may be attached to the panel 102 with rivets 108, with other fasteners, may be glued to the panel 102, or may be alternatively secured to the panel 102 in any well-known manner. The panel 102 may include extra holes to provide flexibility in mounting. The holes 109 may be equally spaced such that the rivets 108 may selectively engage the holes 109. An opposite end of the mounting arm 106 may be secured to an upright 110 of a gondola or other structure in any manner well known in the art.

In the embodiment illustrated, the panel 102 may be constructed of metal. It will be appreciated, however, that alternate materials may be used within the scope of the present teachings. The panel 102 is planar in configuration and includes a front face 112 and a rear face 114. The hooks 104 may be be constructed of metal. The hooks 104 may be welded or otherwise suitably attached to the panel 102. The hooks 104 may extend from opposite sides of the panel 102. The distal ends of the hooks 104 may include an upwardly extending tip for retaining product thereon until it is desired to remove the product one of the hooks 104.

A proximal end of the mounting arm 106 may include a plurality of engagement members for engaging a corresponding plurality of openings in the upright 110 of the gondola. In the embodiment illustrated, the proximal end of the mounting arm 106 is shown to include three engagement members 112A, 112B and 112C. The uppermost engagement member 112A is T-shaped including a first leg extending rearwardly from the remainder of the mounting arm 106 and a second leg perpendicular to the first leg. The second leg extends in both upward and downward directions from the first leg. The other two engagement members are L-shaped including a first leg extending rearwardly from the remainder of the mounting arm 106 and a second leg perpendicular to the first leg. The second leg extends in the downward direction from the first leg.

Figures 3, 3A, 3B:
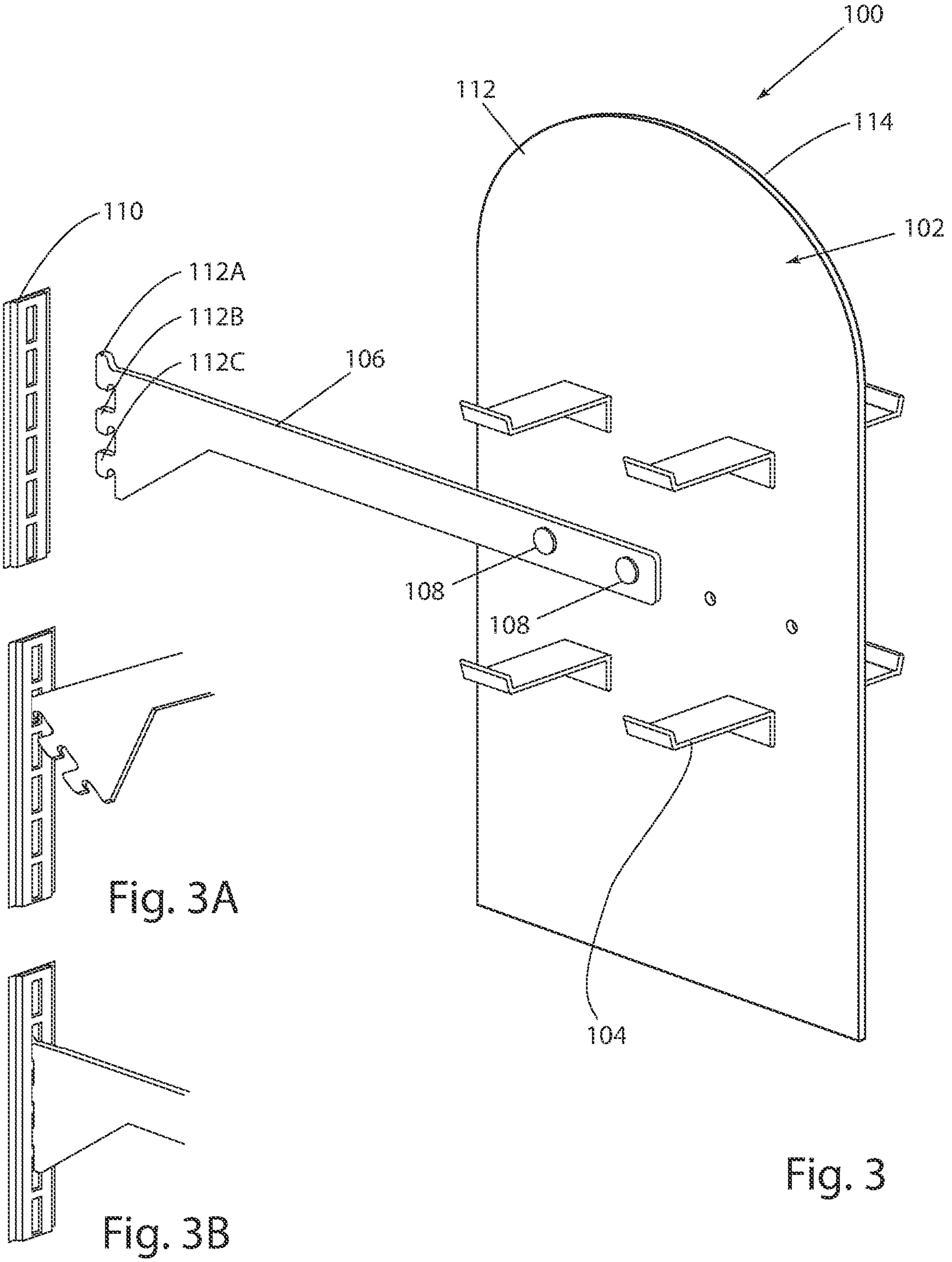
FIG. 3 is a perspective view of another merchandise display assembly in accordance with the present teachings, the merchandise display assembly shown operatively associated with an upright of a gondola prior to engagement of the merchandise display assembly with the upright of the gondola.
FIG. 3A is a perspective view of a portion of the merchandise display assembly of FIG. 3 shown during engagement with the upright of the gondola.
FIG. 3B is another perspective view of the portion of the merchandise display assembly of FIG. 3A shown following engagement with the upright of the gondola.

Engagement of the mounting arm 106 with the upright 110 of the gondola is show in FIGS. 3A and 3B. In a first step shown in FIG. 3A, the proximal end of the mounting arm is angled downwardly and the uppermost or first engagement member 112A of the mounting arm 106 is inserted into a first opening of the upright 110 of the gondola. A distal end of the mounting arm 106 is next rotated downwardly such that the other two engagement members 112B and 112C engage corresponding openings in the upright 110. After this rotation, the proximal end of the mounting arm 16 is shifted downward. It will be noted that the vertical distance from a top of the first engagement member 112A and bottom of the lowermost engagement member 112C is greater than a vertical distance from the top of one hole in the upright 110 and the bottom a third hole down. For this reason, the mounting arm 106 must be angled upon insertion.

Figure 3C:
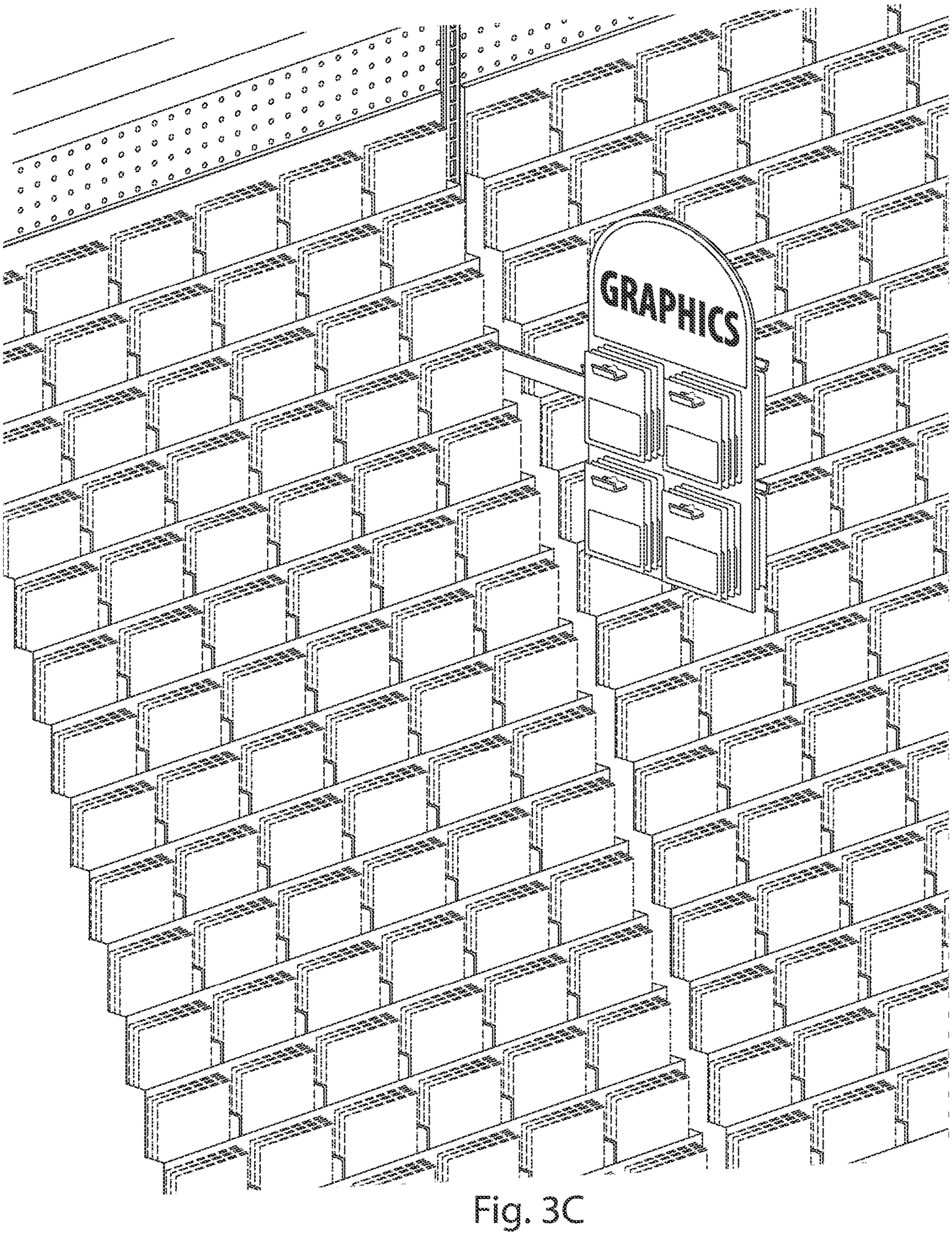
FIG. 3C is a perspective view of the merchandise display assembly of FIG. 3 shown operatively associated with a gondola conventionally carrying a plurality of greeting cards, the merchandise display assembly attached to the upright of the gondola and carrying merchandise for retail display.

With particular reference to FIG. 3C, the merchandise display assembly 100 is shown operatively associated with a gondola conventionally carrying a plurality of greeting cards. The greeting cards are arranged in a plurality of tier rows. The merchandise display assembly 100 is attached to the upright 110 of the gondola and carries merchandise for retail display. As illustrated, the mounting member 106 horizontally extends from the upright 110 of the gondola to the panel 102 and extends perpendicular thereto in a vertical direction. The merchandise display assembly 100 positions the merchandise for retail display in front of and in close proximity to the goods otherwise carried by the gondola (e.g., greeting cards) without interfering the display of the goods otherwise carried by the gondola. The merchandise for retail display carried by the merchandise display assembly 100 may be a complementary product. For example, in the use illustrated in FIG. 3C, the merchandise for retail display carried by the merchandise display assembly 100 may be gift cards that can be purchased along with a greeting card.

Figure 4:
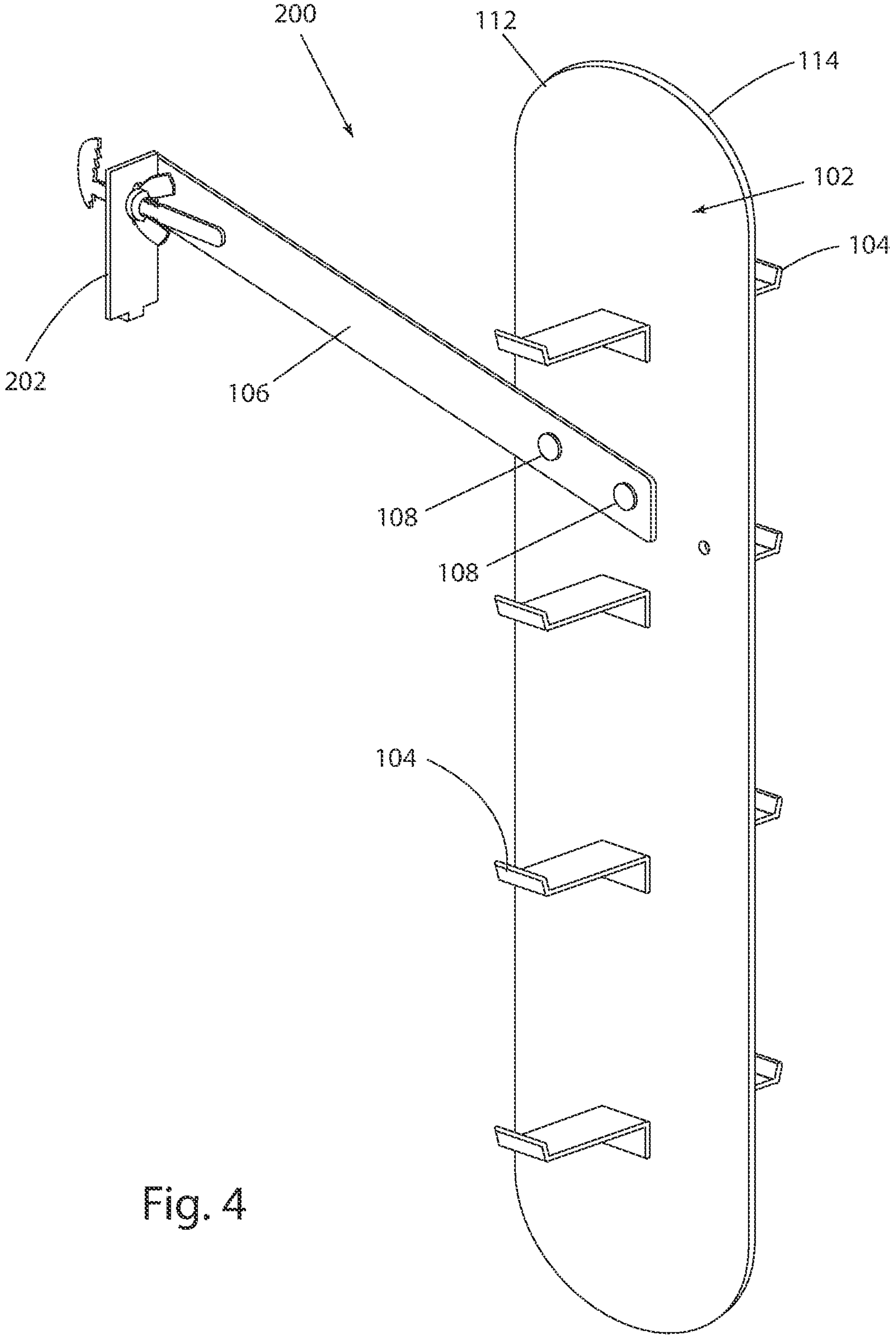
FIG. 4 is a perspective view of another merchandise display assembly in accordance with the present teachings.
Figure 4A:
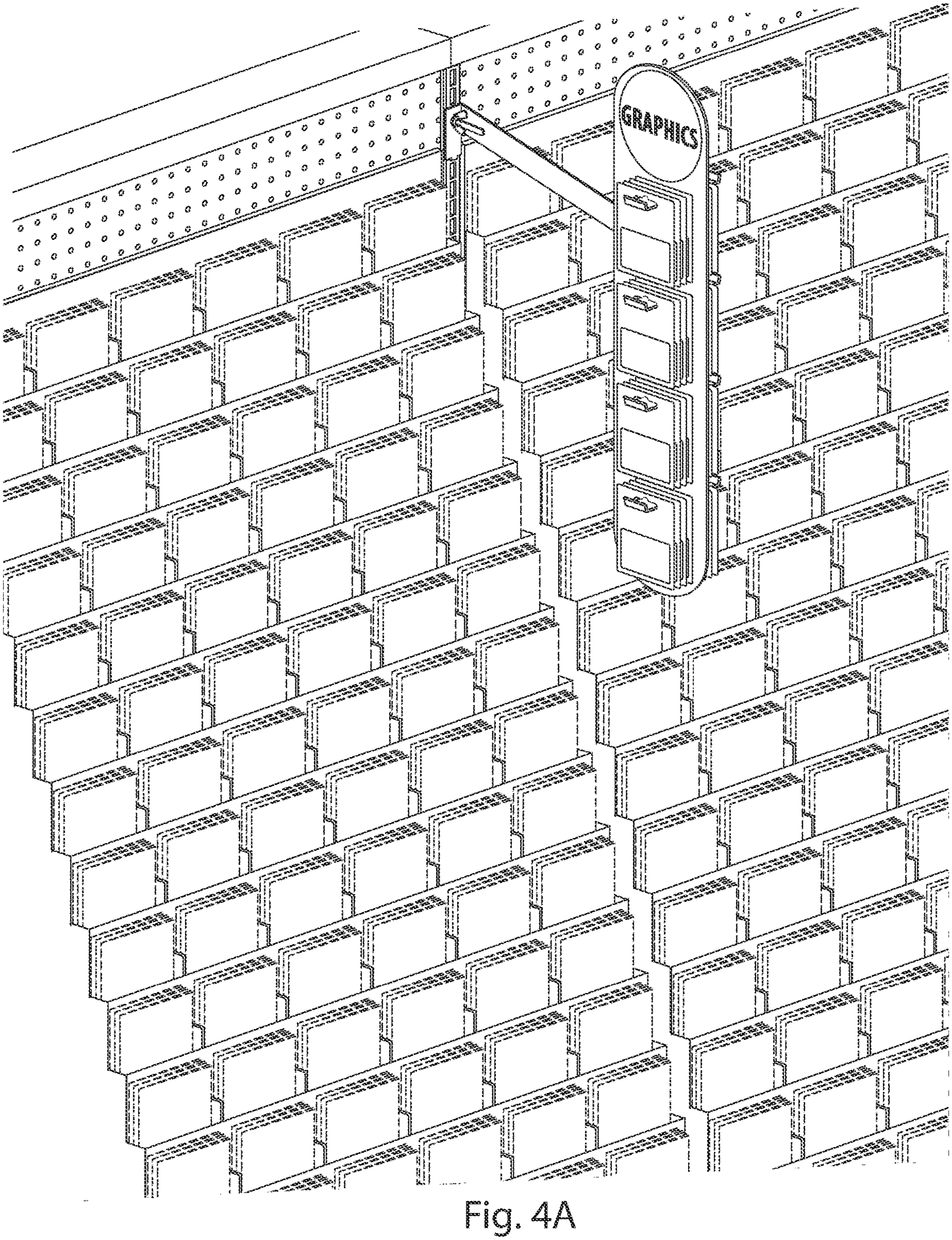
FIG. 4A is a perspective view of the merchandise display assembly of FIG. 4 shown operatively associated with a gondola conventionally carrying a plurality of greeting cards, the merchandise display assembly attached to the upright of the gondola and carrying merchandise for retail display.

Turning to FIGS. 4 and 4A, another merchandise display assembly in accordance with the present teachings is illustrated and identified at reference character 200. Given the similarities between the merchandise display assembly 200 and the merchandise display assembly 100, common reference characters will be used to identify similar elements. The features of the merchandise display assembly 200 of FIG. 4 will be understood to be similar to corresponding features of the merchandise display assembly of FIG. 3 to the extent not otherwise described. The mounting arm 106 is shown to include an alternative mounting end. As shown, the mounting arm 106 includes a mounting flange 202. The mounting flange 202 may be formed with the remainder of the mounting arm 106 of metal and may be oriented perpendicular with respect to a longitudinal axis of the arm 106. The mounting flange 202 includes a hole that receives a fastener 204. The fastener 204 has a toothed portion at a first end thereof for engagement an upright of a gondola and a second threaded end for receiving a nut 206. The arm 106 may angle downwardly from the mounting end to the opposite end. The opposite end of the mounting arm 106 may be attached to the panel 102 with rivets 108, with other fasteners, or may be glued to the panel 112. The rivets 108 pass through holes 109 in the panel 102. The panel 102 may include extra holes to provide flexibility in mounting. The holes 109 may be equally spaced such that the rivets 108 may selectively engage the holes 109.

With particular reference to FIG. 4A, the merchandise display assembly 200 is shown operatively associated with a gondola conventionally carrying a plurality of greeting cards. The merchandise display assembly 200 is attached to the upright 110 of the gondola and carries merchandise for retail display. As illustrated, the mounting member 106 extends at a downward angle as it extends outwardly from the upright 110 of the gondola and the panel 102 extends in a vertical direction. As such, the axis of elongation of the panel 102 is askew to the axis of elongation of the mounting member 106.

Figure 5:
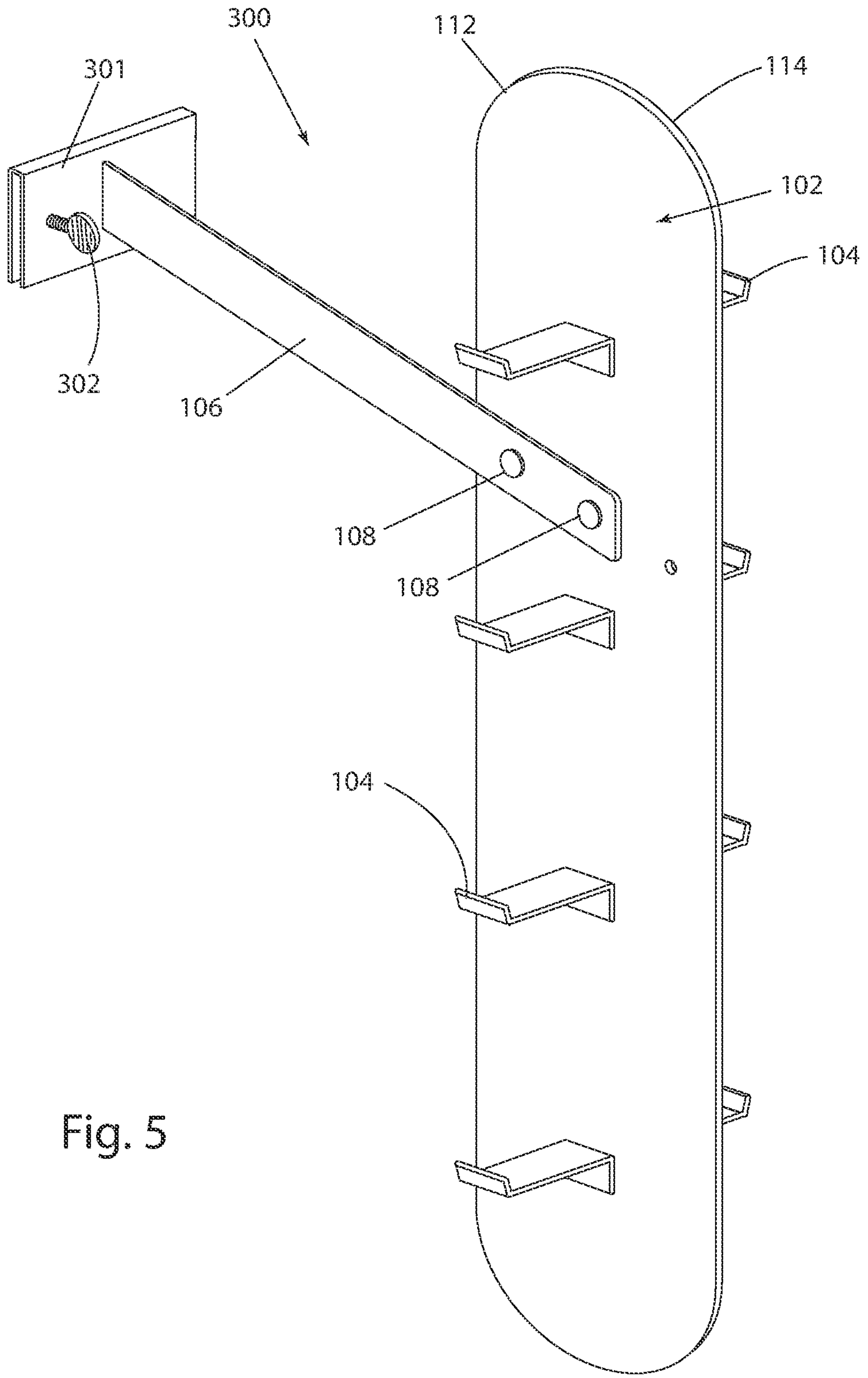
FIG. 5 is a perspective view of another merchandise display assembly in accordance with the present teachings.
Figure 5A:
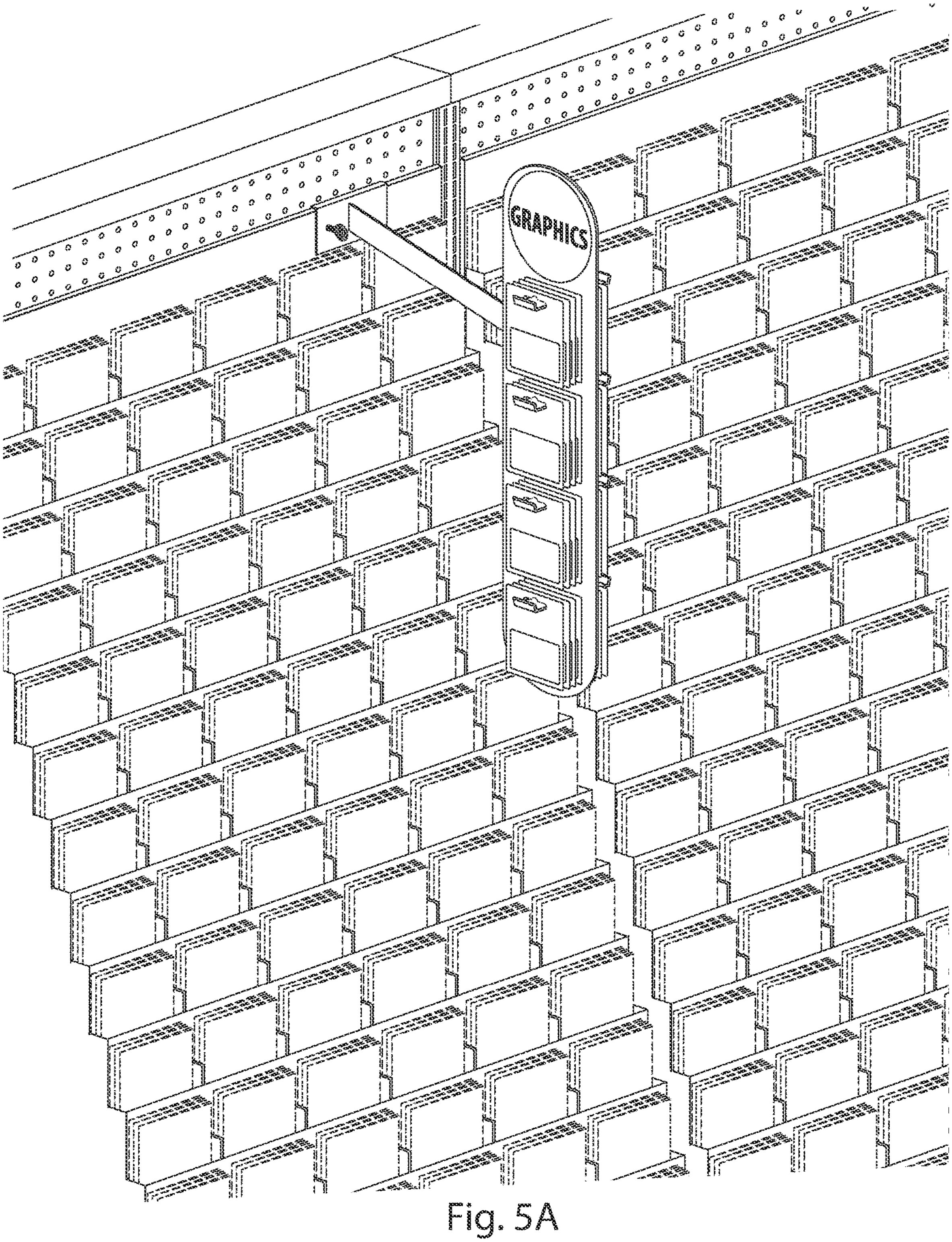
FIG. 5A is a perspective view of the merchandise display assembly of FIG. 5 shown operatively associated with a gondola conventionally carrying a plurality of greeting cards, the merchandise display assembly attached to greeting card partition of a conventional gondola system and carrying merchandise for retail display.

Turning to FIGS. 5 and 5A, another merchandise display assembly in accordance with the present teachings is illustrated and generally identified at reference character 300. The merchandise display assembly 300 of FIG. 5 is similar to the merchandise display assembly 200 of FIG. 4. For this reason, the features of the merchandise display assembly 300 of FIG. 5 will be understood to be similar to corresponding features of the merchandise display assembly 200 of FIGS. 4 and 4A to the extent not otherwise described and common reference characters will be used for similar features discussed above. The mounting arm 106 includes a first end or mounting end 301 for slipping over and engaging a partition or lip of a stationary structure. In the embodiment illustrated, the stationary structure engaged by the mounting end of the mounting arm is a greeting card partition 304 of a conventional gondola system. The mounting end 301 may be U-shaped and open in a downward direction. A fastener 302 extends through one leg of the U-shaped mounting end 301 for securing the mounting arm 106. In the embodiment illustrated, the mounting member 106 extends at a downward angle as it extends outwardly from the greeting card partition 304 of the gondola and the panel 102 extends in a vertical direction. As such, the axis of elongation of the panel 102 is askew to the axis of elongation of the mounting member 106.

Figure 6:
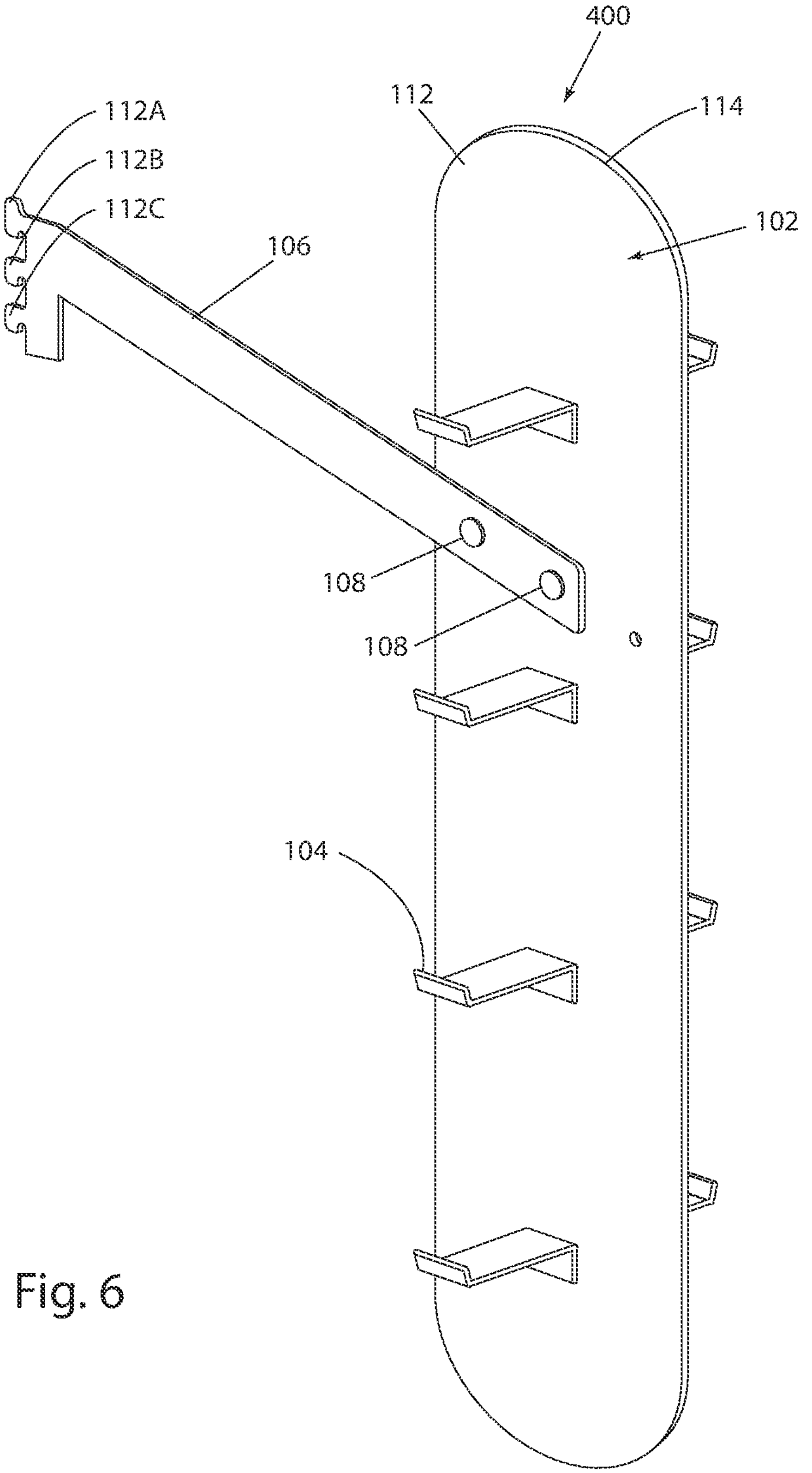
FIG. 6 is a perspective view of another merchandise display assembly in accordance with the present teachings.
Figure 6A:
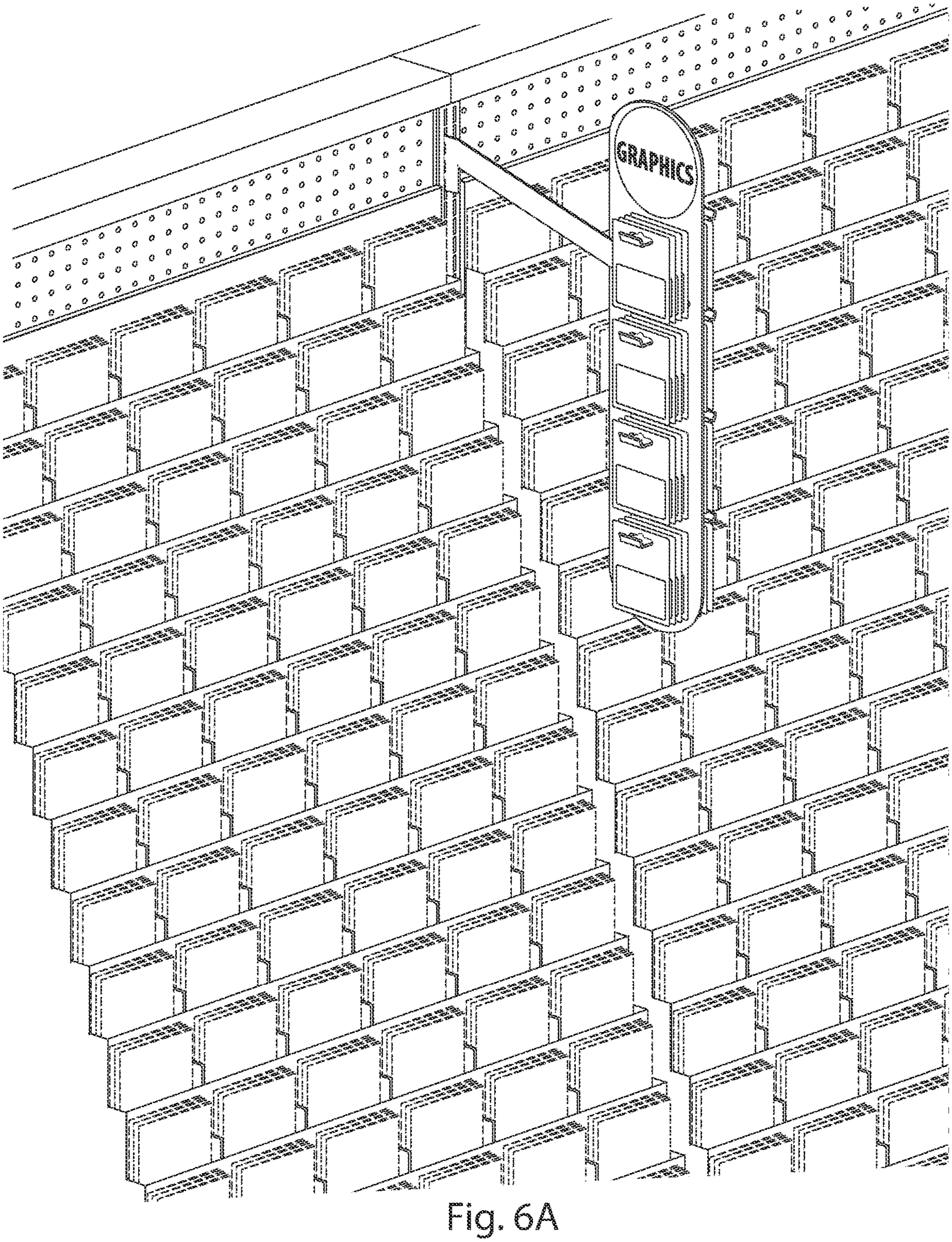
FIG. 6A is a perspective view of the merchandise display assembly of FIG. 6 shown operatively associated with a gondola conventionally carrying a plurality of greeting cards, the merchandise display assembly attached to the upright of the gondola and carrying merchandise for retail display.

Turning to FIGS. 6 and 6A, another merchandise display assembly in accordance with the present teachings is illustrated and generally identified at reference character 400. The merchandise display assembly 400 of FIG. 6 is again similar to the merchandise display assemblies 100 and 200 of FIGS. 3 and 4 respectfully. For this reason, the features of the merchandise display assembly 400 of FIGS. 6 and 6A will be understood to be similar to corresponding features of the merchandise display assemblies previously described herein to the extent not otherwise described and common reference characters will be used for similar features discussed above. The merchandise display assembly 400 is illustrated to include the panel 102 of FIG. 4 and the angled mounting arm 106 of FIG. 4 adapted to include the mounting end of FIG. 3 for engaging the upright 110 of the gondola. In the embodiment illustrated, the mounting member 106 extends at a downward angle as it extends outwardly from the upright 110 of the gondola and the panel 102 extends in a vertical direction. As such, the axis of elongation of the panel 102 is askew to the axis of elongation of the mounting member 106.

Figure 7:
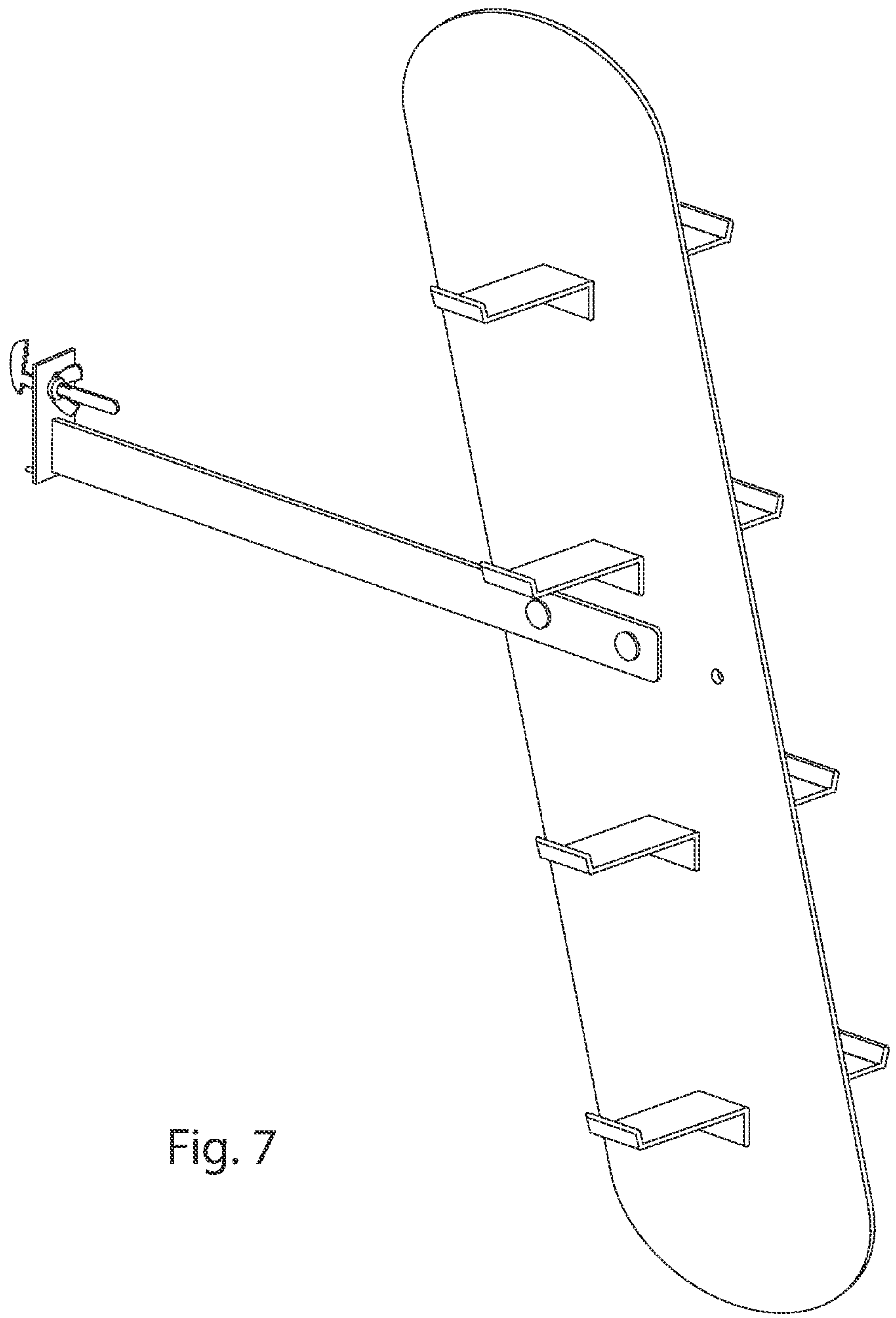
FIG. 7 is a perspective view of another merchandise display assembly in accordance with the present teachings.
Figure 7A:
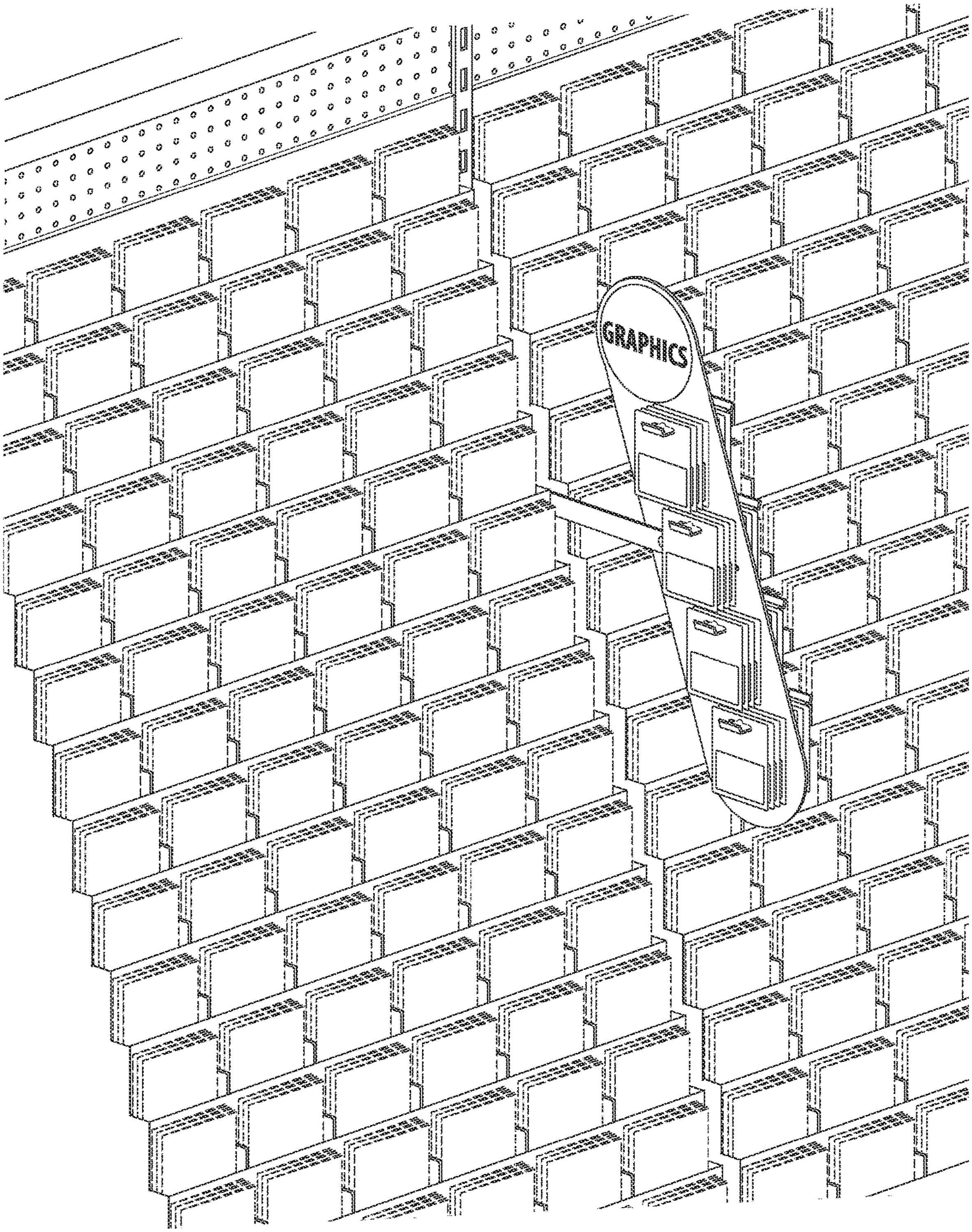
FIG. 7A is a perspective view of the merchandise display assembly of FIG. 7 shown operatively associated with a gondola conventionally carrying a plurality of greeting cards, the merchandise display assembly attached to the upright of the gondola and carrying merchandise for retail display.

Turning to FIGS. 7 and 7A, another merchandise display assembly in accordance with the present teachings is illustrated and generally identified at reference character 550. The merchandise display assembly 500 of FIGS. 7 and 7A is again similar to the merchandise display assemblies 100 and 200 of FIGS. 3 and 4 respectfully. For this reason, the features of the merchandise display assembly 500 of FIGS. 7 and 7A will be understood to be similar to corresponding features of the merchandise display assemblies previously described herein to the extent not otherwise described and common reference characters will be used for similar features discussed above. The merchandise display assembly 500 is illustrated to include the panel 102 of FIG. 4 and the horizontal mounting arm 106 of FIG. 3 adapted to include the mounting end 202 of FIG. 4 for engaging the upright 110 of the gondola. In the embodiment illustrated, the mounting member 106 extends horizontally from the upright 110 of the gondola and the axis of elongation of the panel 102 is askew to the axis of elongation of the mounting member 106.

Figure 8:
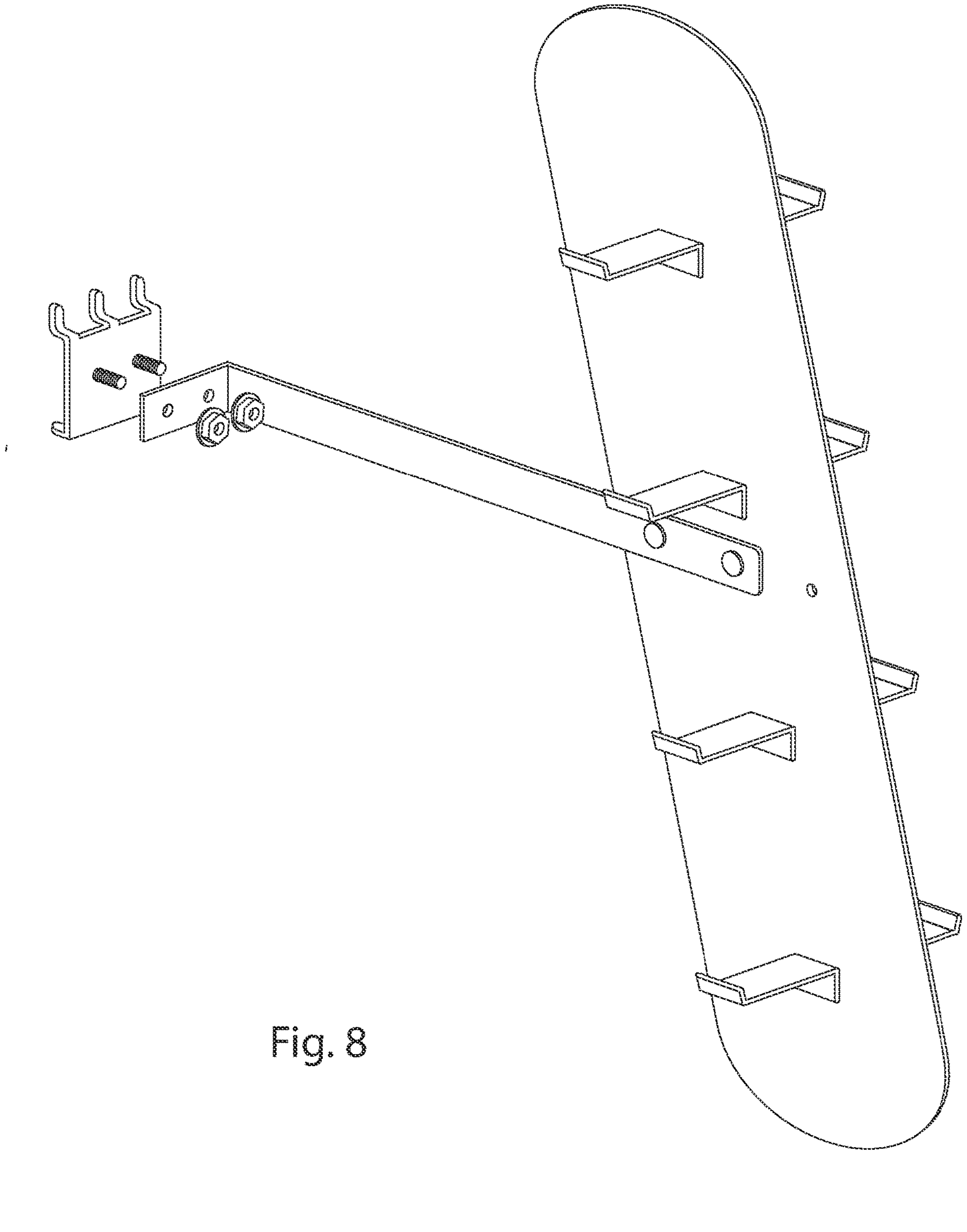
FIG. 8 is a perspective view of another merchandise display assembly in accordance with the present teachings.
Figure 8A:
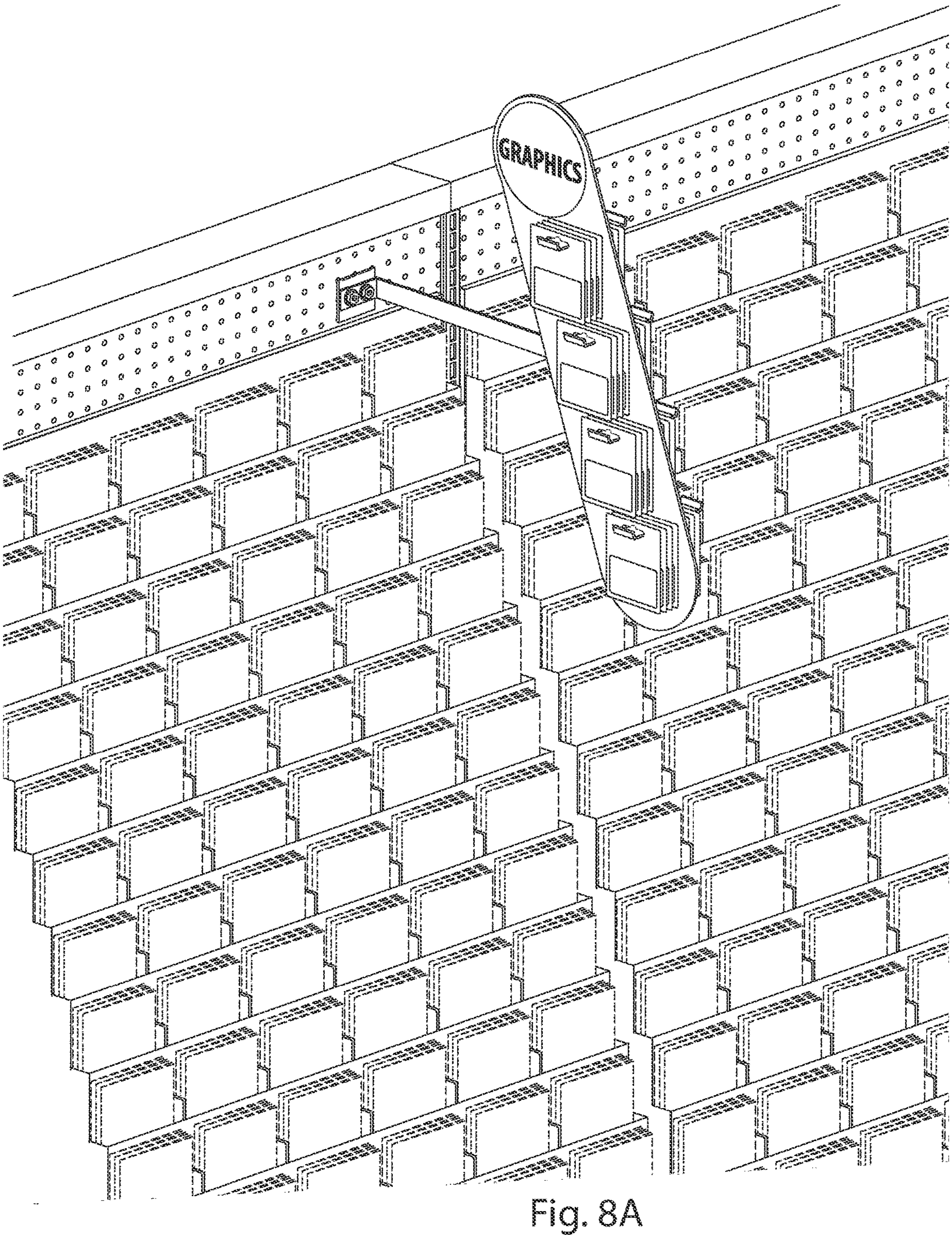
FIG. 8A is a perspective view of the merchandise display assembly of FIG. 8 shown operatively associated with a gondola conventionally carrying a plurality of greeting cards, the merchandise display assembly attached to the upright of the gondola and carrying merchandise for retail display.

Turning to FIGS. 8 and 8A, another merchandise display assembly in accordance with the present teachings is illustrated and generally identified at reference character 650. The merchandise display assembly 650 of FIGS. 8 and 8A is again similar to the previously described merchandise display assemblies. For this reason, the features of the merchandise display assembly 650 of FIGS. 7 and 7A will be understood to be similar to corresponding features of the merchandise display assemblies previously described herein to the extent not otherwise described and common reference characters will be used for similar features discussed above. The merchandise display assembly 650 is illustrated to include the panel 102 of FIG. 4 and the horizontal mounting arm 106 of FIG. 3. The mounting arm 106 has been adapted to engage the holes of a pegboard 652 of the gondola. As shown in FIG. 8, a proximal end or mounting end of the mounting arm 106 includes a flange 654 extending perpendicular to the remainder of the mounting arm 106. The flange 654 cooperates with a mounting bracket 656. The mounting bracket 656 includes a first plurality of prongs for engaging holes of the pegboard 652. The first plurality of prongs upwardly extend from an upper edge of the bracket 656. The mounting bracket 656 further includes a second plurality of prongs for engaging holes of the pegboard 652. The second plurality of prongs rearwardly extend from a lower edge of the bracket 656. A pair of threaded shafts extend from the bracket, pass through holes in the flange 654, and engage nuts. In the embodiment illustrated, the mounting member 106 extends horizontally from the pegboard 652 of the gondola and the axis of elongation of the panel 102 is askew to the axis of elongation of the mounting member 106.

Figure 9:
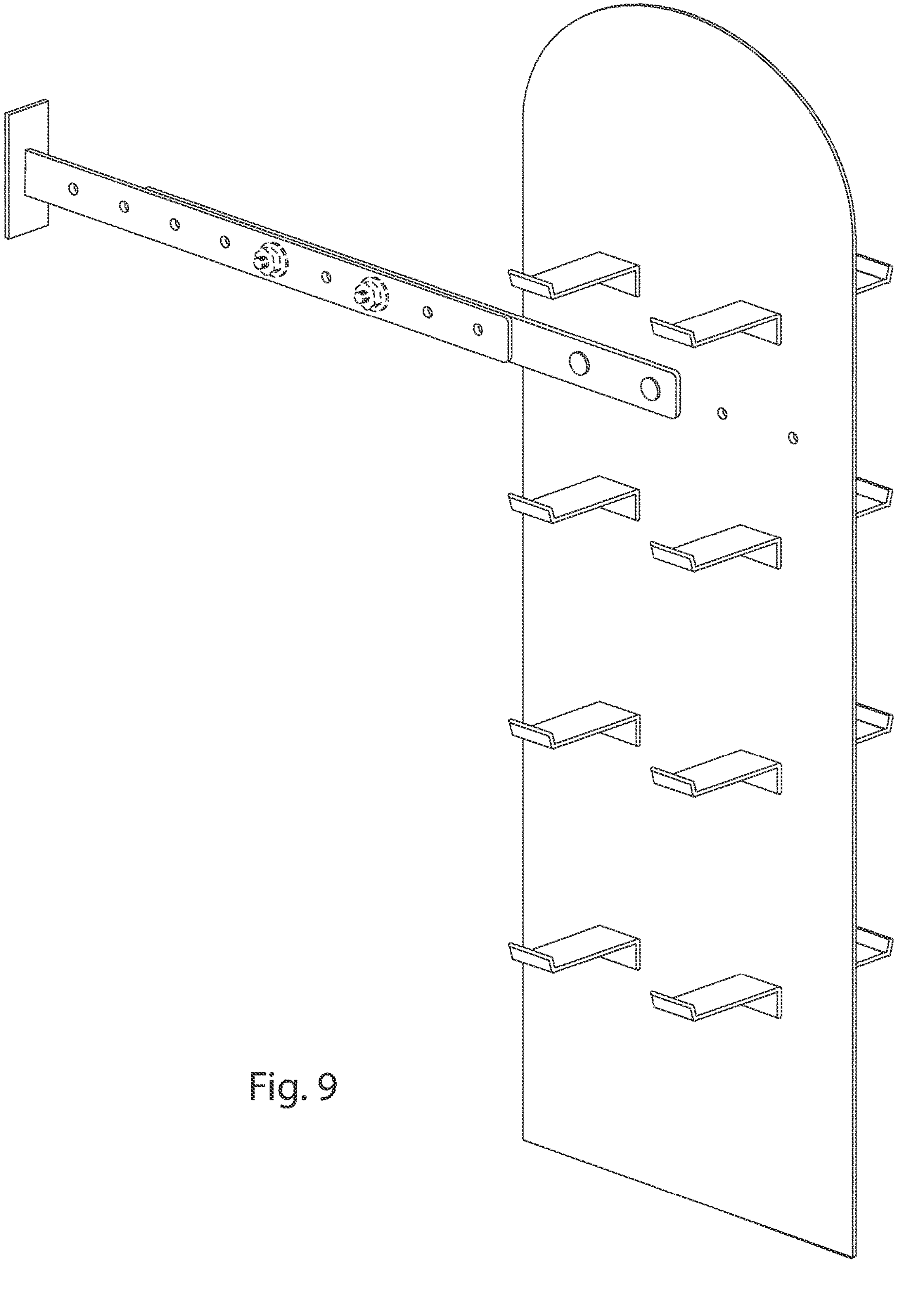
FIG. 9 is a perspective view of another merchandise display assembly in accordance with the present teachings.

FIGS. 9-19 include further variations of the present teachings. As above, similar reference characters will be used to identify similar elements. In FIG. 9, another merchandise display assembly in accordance with the present teachings is illustrated and generally identified at reference character 700. The merchandise display assembly 700 of FIG. 9 includes an extendable mounting arm 106. The mounting arm 106 includes a first portion 106A and a second portion 106B. Both portions 106A and 106B are formed to include a plurality of holes for receiving fasteners. A length of the mounting arm 106 may be adjusted by alignment of the holes. A proximal end of the mounting arm 106 is generically illustrated. It will be understood that the mounting arm 106 of FIG. 9 may be adapted to include any of the mounting structures illustrated herein. The mounting arm 106 extends horizontally from the proximal end. It will be understood, however, that the mounting arm 106 may extend at an angle to from the proximal end. The panel 102 is elongated in a direction perpendicular to an elongated axis of the mounting arm 106. Alternatively, the panel 102 may be elongated in a direction askew to the elongated axis of the mounting arm 106.

Figure 10:
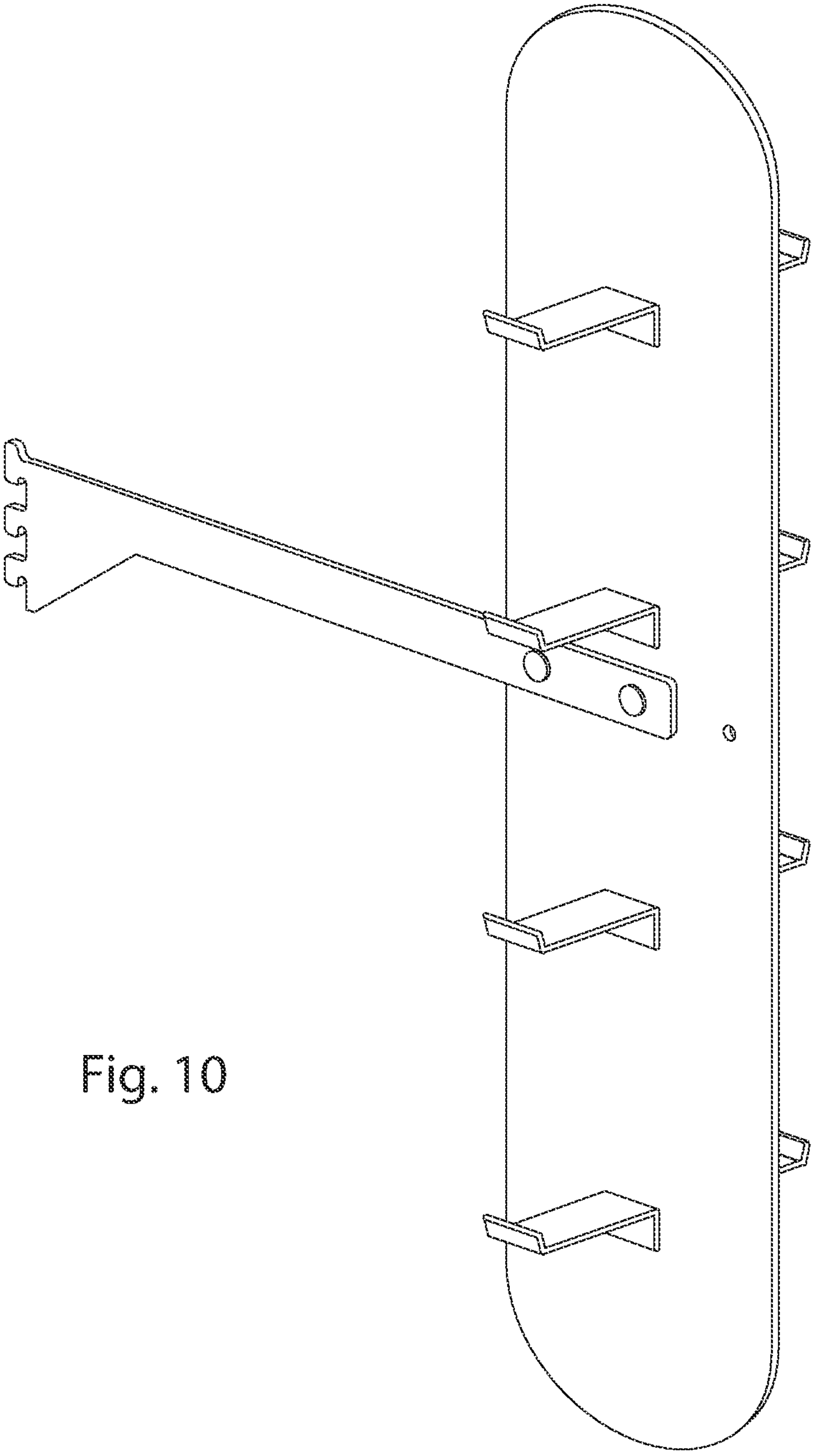
FIG. 10 is a perspective view of another merchandise display assembly in accordance with the present teachings.

Turning to FIG. 10, another merchandise display assembly in accordance with the present teachings is illustrated and generally identified at reference character 800. A proximal end of the mounting arm 106 includes the structure of FIG. 3. The mounting arm 106 extends horizontally from the proximal end. The panel 102 is elongated in a direction perpendicular to an elongated axis of the mounting arm 106.

Figure 11:
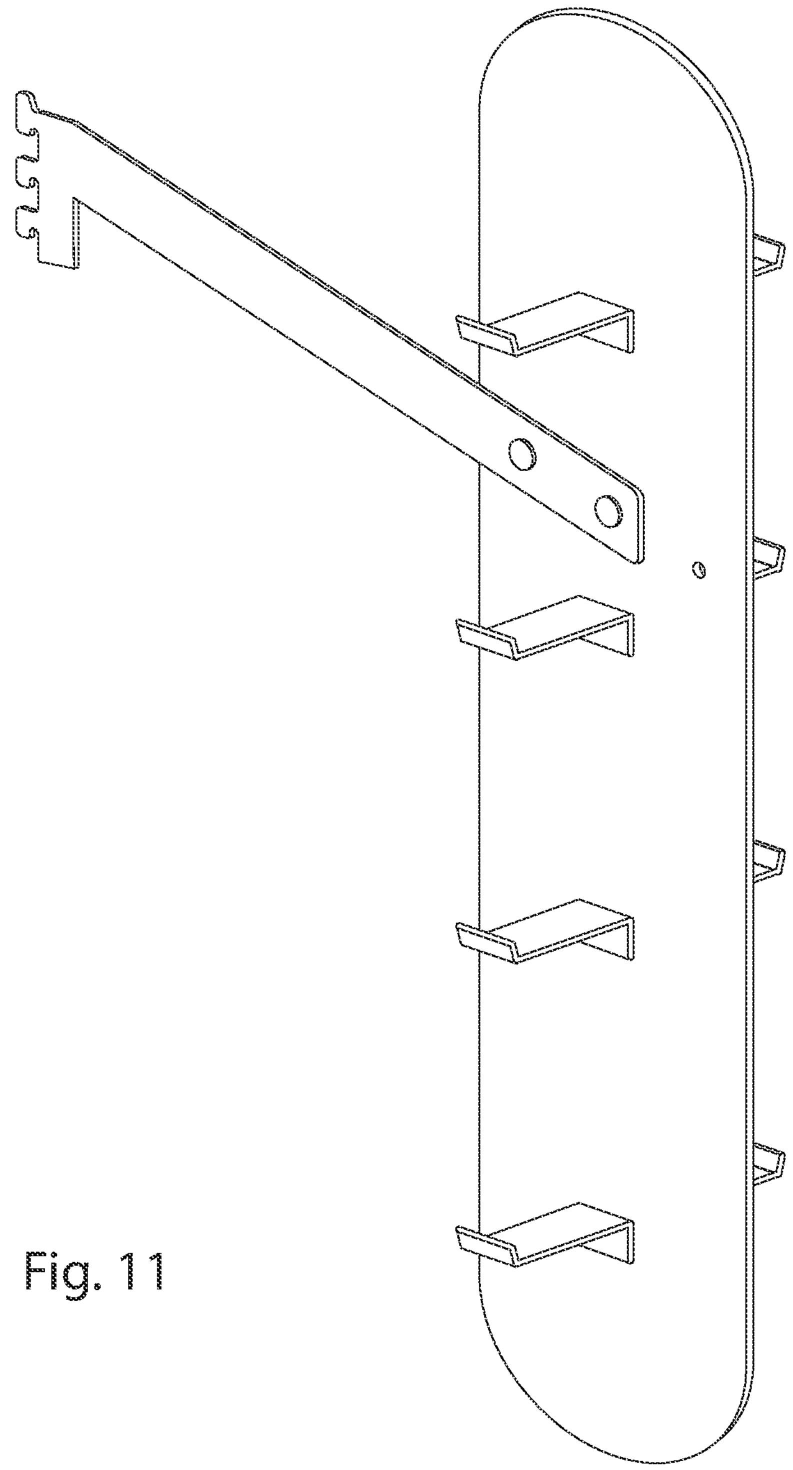
FIG. 11 is a perspective view of another merchandise display assembly in accordance with the present teachings.

Turning to FIG. 11, another merchandise display assembly in accordance with the present teachings is illustrated and generally identified at reference character 900. A proximal end of the mounting arm 106 includes the structure of FIG. 3. The mounting arm 106 extends at an angle to the horizontal from the proximal end. The panel 102 is vertically elongated and thereby extends in a direction askew to the elongated axis of the mounting arm 106.

Figure 12:
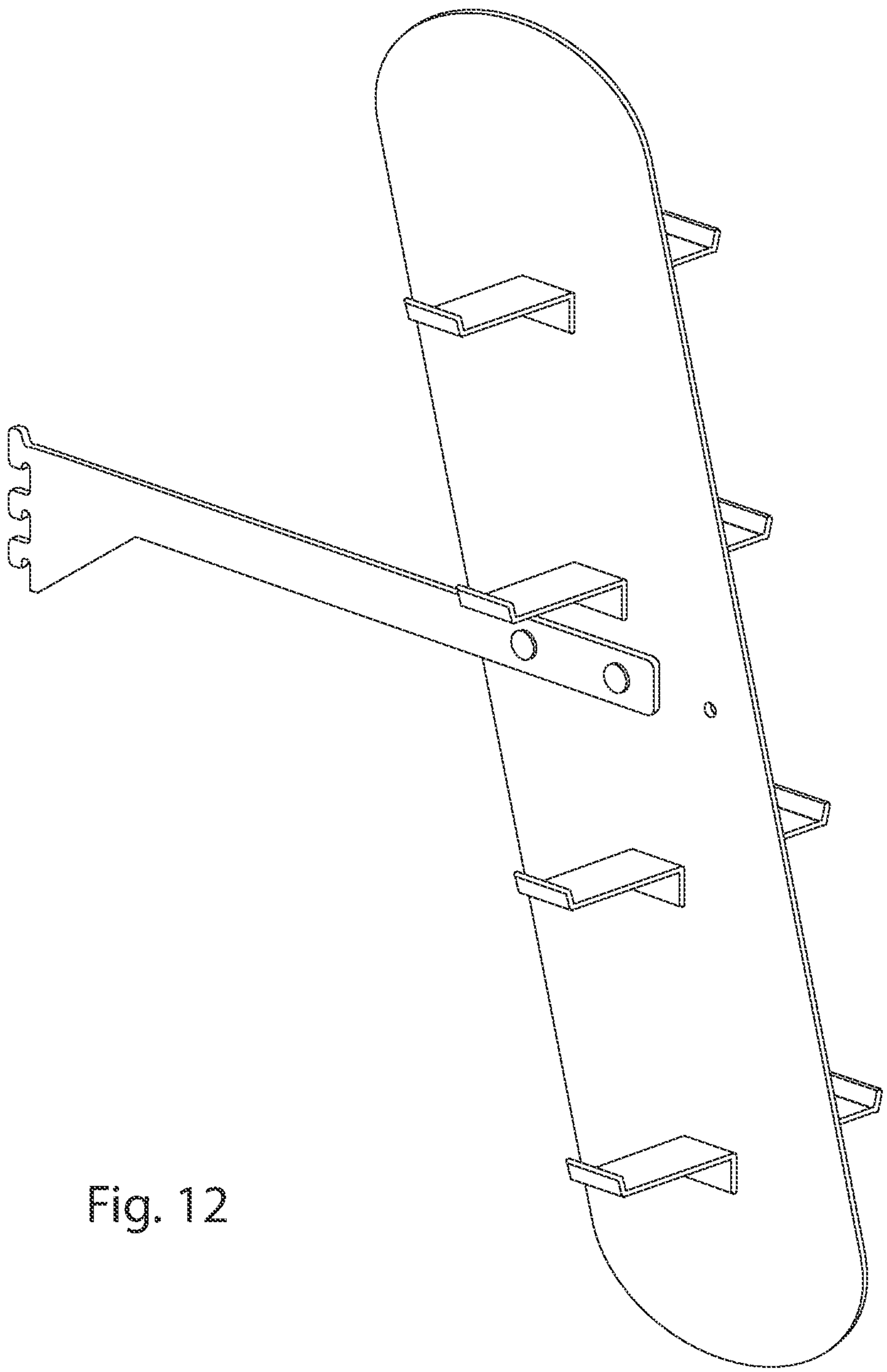
FIG. 12 is a perspective view of another merchandise display assembly in accordance with the present teachings.

Turning to FIG. 12, another merchandise display assembly in accordance with the present teachings is illustrated and generally identified at reference character 1000. A proximal end of the mounting arm 106 includes the structure of FIG. 3. The mounting arm 106 extends horizontally from the proximal end. An elongated axis of the panel 102 is oriented askew to the elongated axis of the mounting arm 106.

Figure 13:
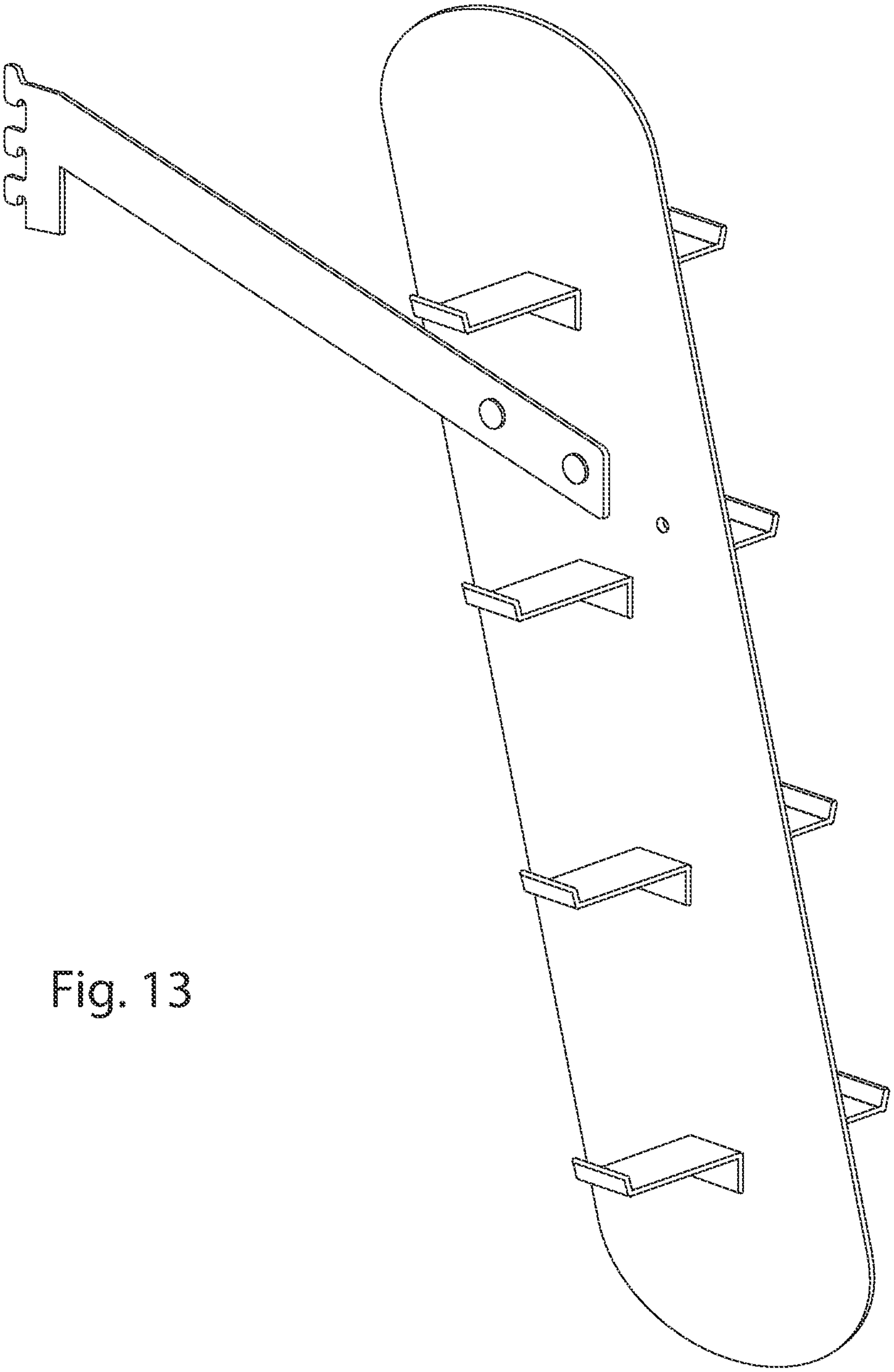
FIG. 13 is a perspective view of another merchandise display assembly in accordance with the present teachings.

Turning to FIG. 13, another merchandise display assembly in accordance with the present teachings is illustrated and generally identified at reference character 1100. A proximal end of the mounting arm 106 includes the structure of FIG. 3. The mounting arm 106 extends downwardly at an angle from the proximal end. An elongated axis of the panel 102 is oriented askew to a vertical direction.

Figure 14:
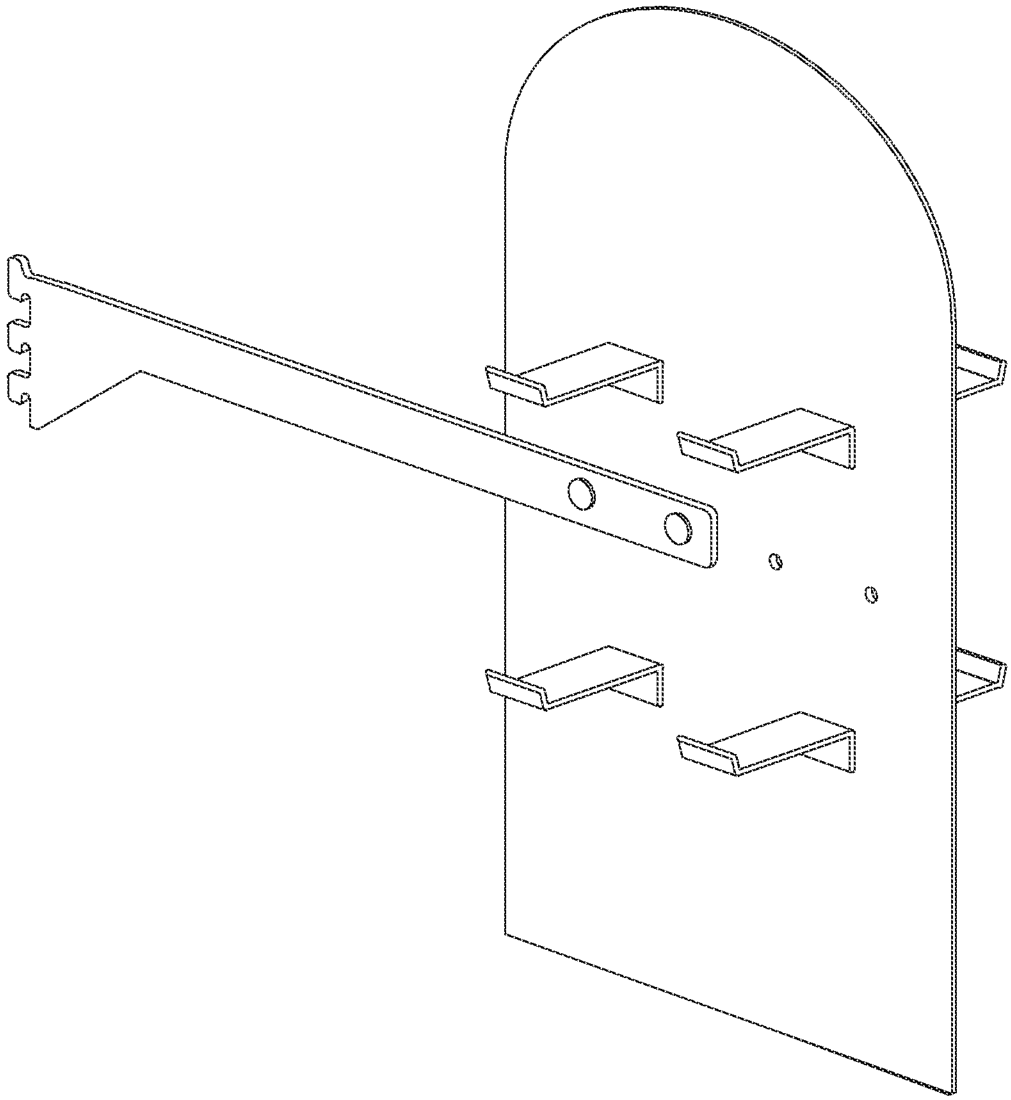
FIG. 14 is a perspective view of another merchandise display assembly in accordance with the present teachings.

Turning to FIG. 14, another merchandise display assembly in accordance with the present teachings is illustrated and generally identified at reference character 1200. The merchandise display assembly 1200 of FIG. 14 is similar to the merchandise display assembly 800 of FIG. 10 but incorporates a different shaped panel 102.

Figure 15:
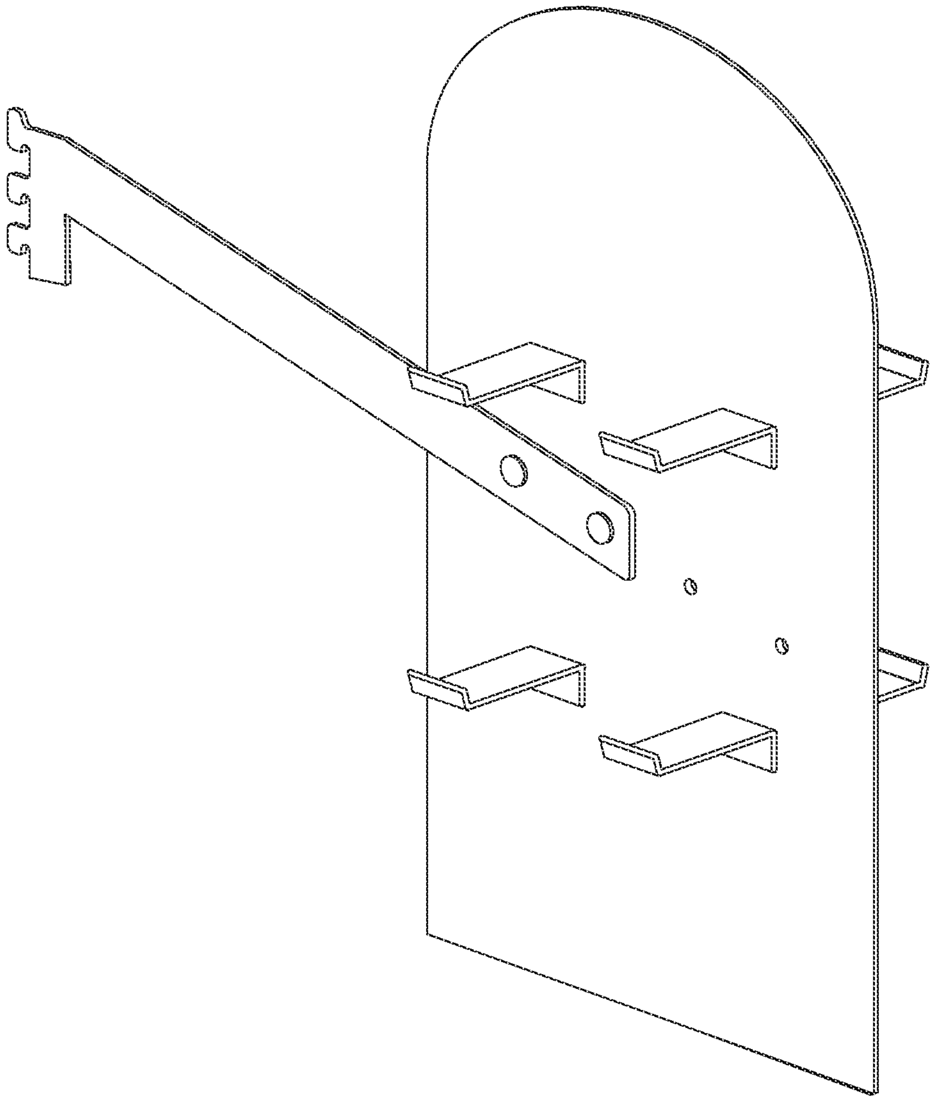
FIG. 15 is a perspective view of another merchandise display assembly in accordance with the present teachings.

Turning to FIG. 15, another merchandise display assembly in accordance with the present teachings is illustrated and generally identified at reference character 1300. The merchandise display assembly 1300 of FIG. 15 is similar to the merchandise display assembly 900 of FIG. 11 but incorporates a different shaped panel 102.

Figure 16:
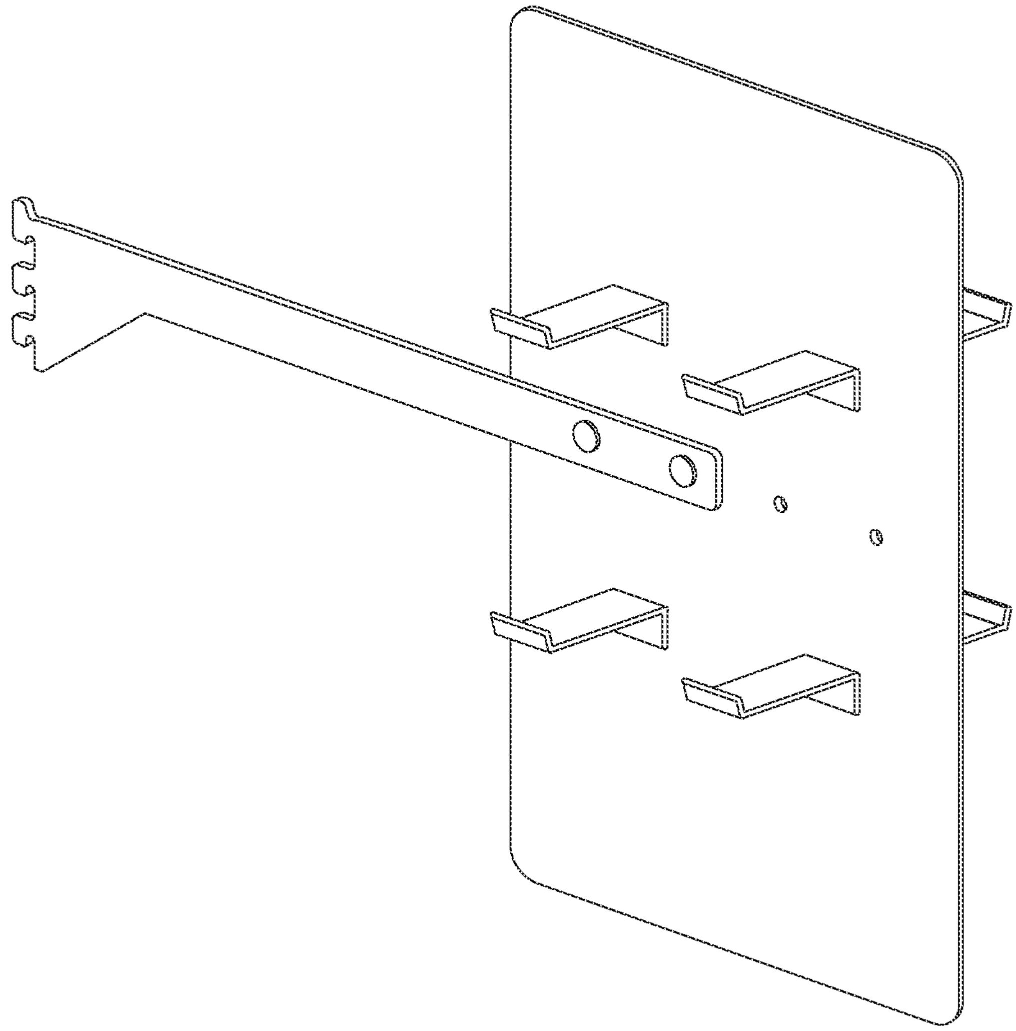
FIG. 16 is a perspective view of another merchandise display assembly in accordance with the present teachings.

Turning to FIG. 16, another merchandise display assembly in accordance with the present teachings is illustrated and generally identified at reference character 1400. The merchandise display assembly 1200 of FIG. 14 is again similar to the merchandise display assembly 800 of FIG. 10 but incorporates a different shaped panel 102.

Figure 17:
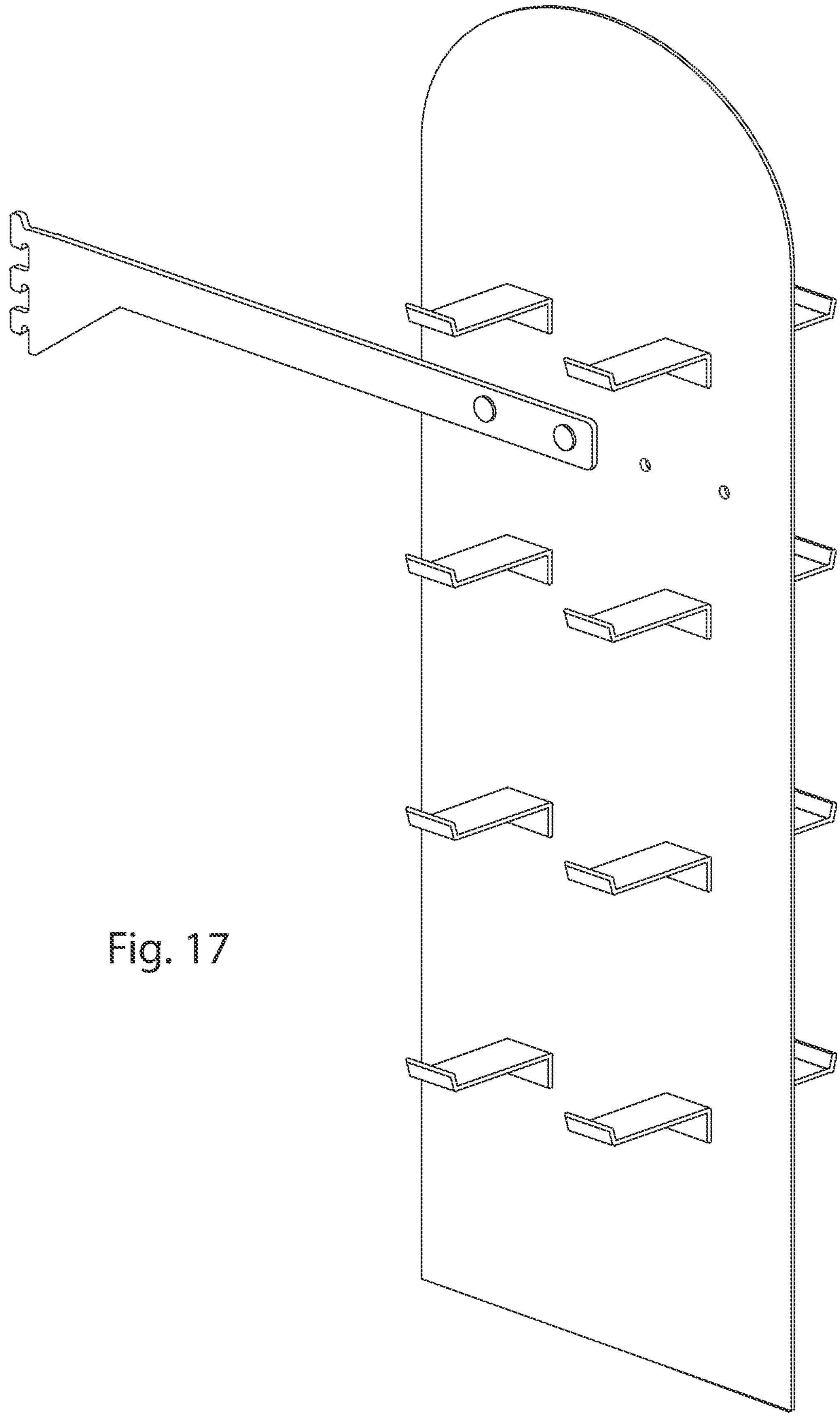
FIG. 17 is a perspective view of another merchandise display assembly in accordance with the present teachings.

Turning to FIG. 17, another merchandise display assembly in accordance with the present teachings is illustrated and generally identified at reference character 1500. The merchandise display assembly 1200 of FIG. 14 is again similar to the merchandise display assembly 800 of FIG. 10 but incorporates a different shaped panel 102.

Figure 18:
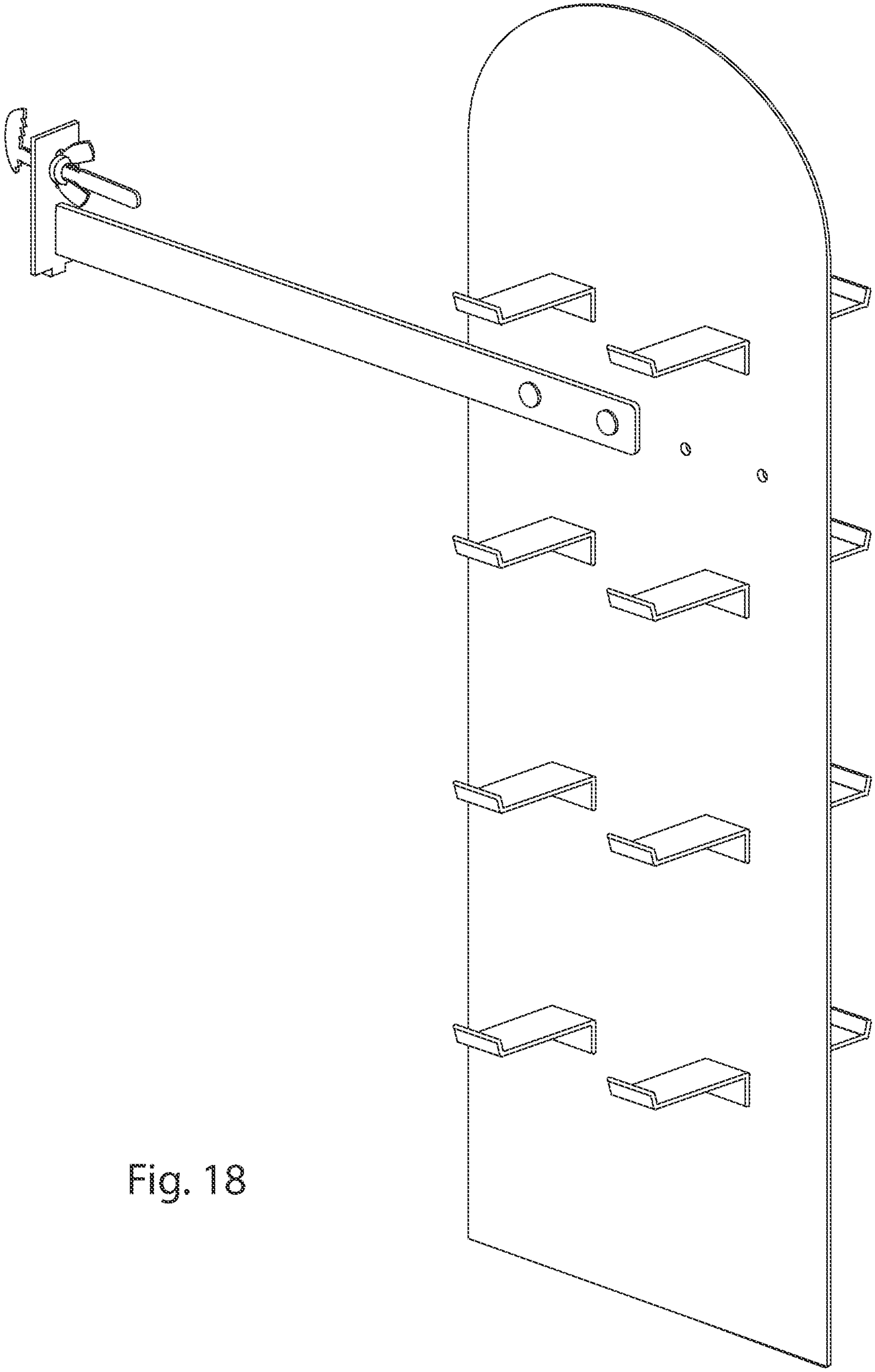
FIG. 18 is a perspective view of another merchandise display assembly in accordance with the present teachings.
Figure 18A:
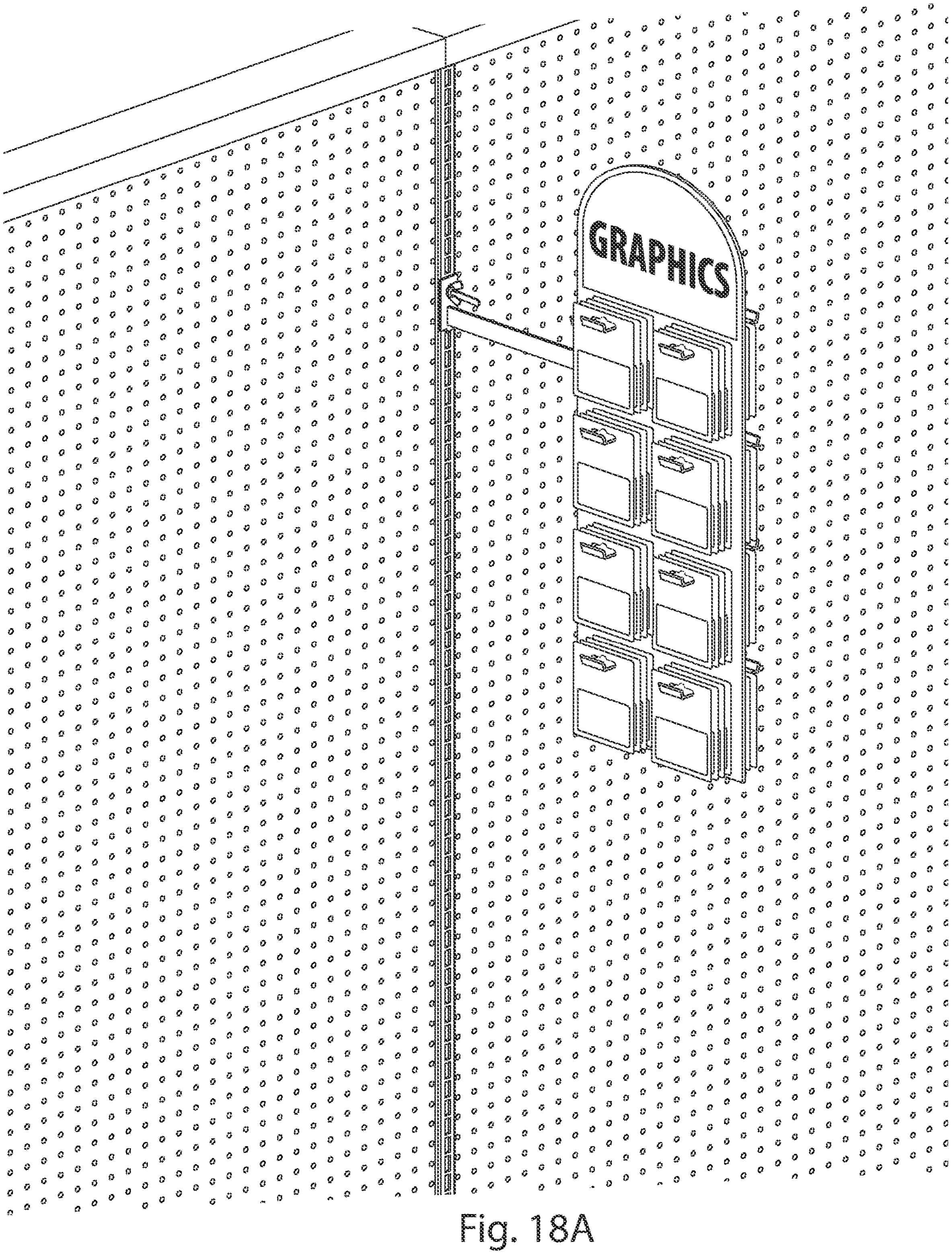
FIG. 18A is a perspective view of the merchandise display assembly of FIG. 18 shown operatively associated with a gondola conventionally carrying a plurality of greeting cards, the merchandise display assembly attached to the upright of the gondola and carrying merchandise for retail display.

Turning to FIGS. 18 and 18A, another merchandise display assembly in accordance with the present teachings is illustrated and generally identified at reference character 1600. The merchandise display assembly 1600 of FIGS. 18 and 18A is similar to the merchandise display assembly 1500 of FIG. 17 but incorporates the mounting structure of FIG. 4.

Figure 19:
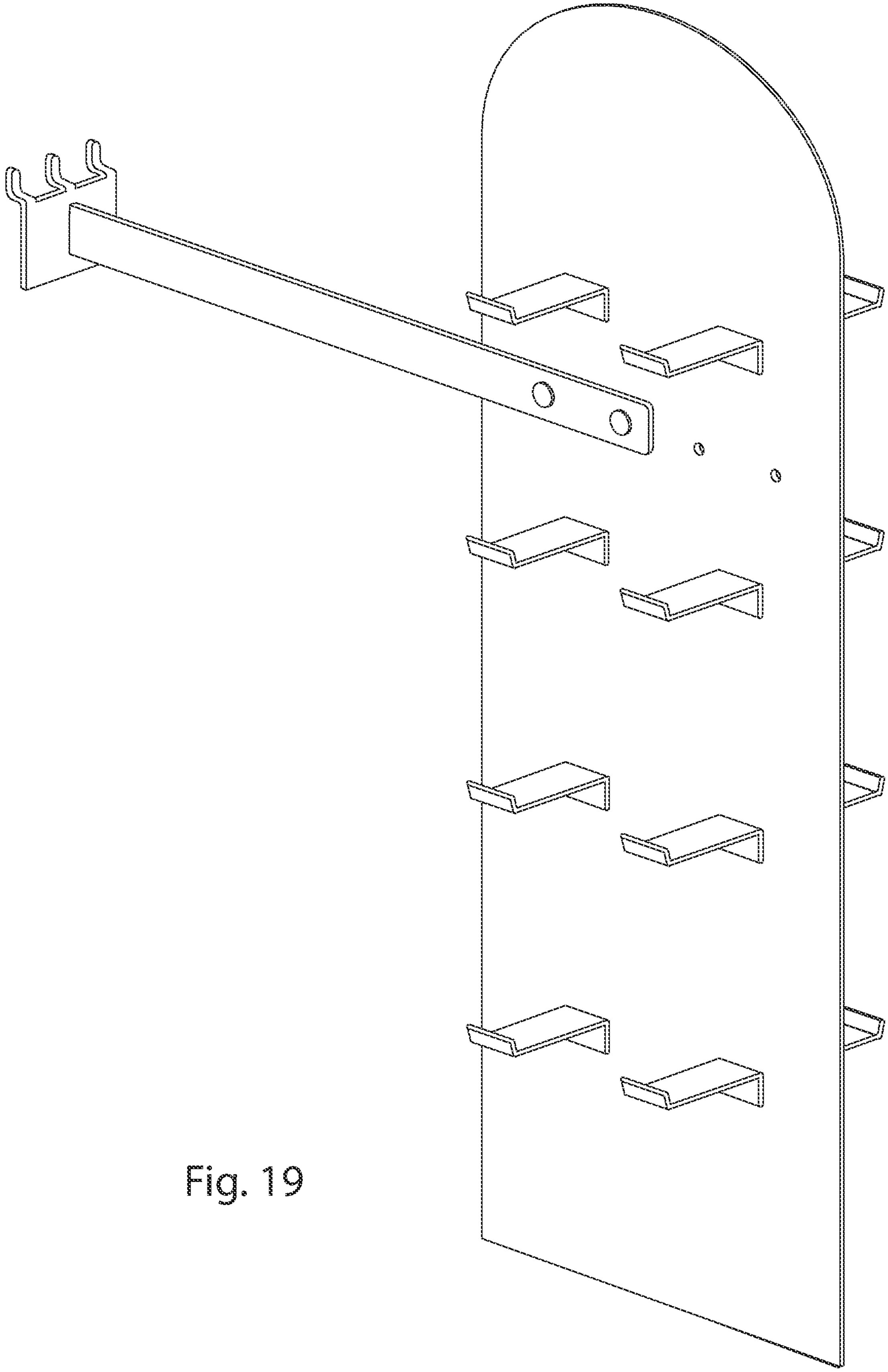
FIG. 19 is a perspective view of another merchandise display assembly in accordance with the present teachings.
Figure 19A:
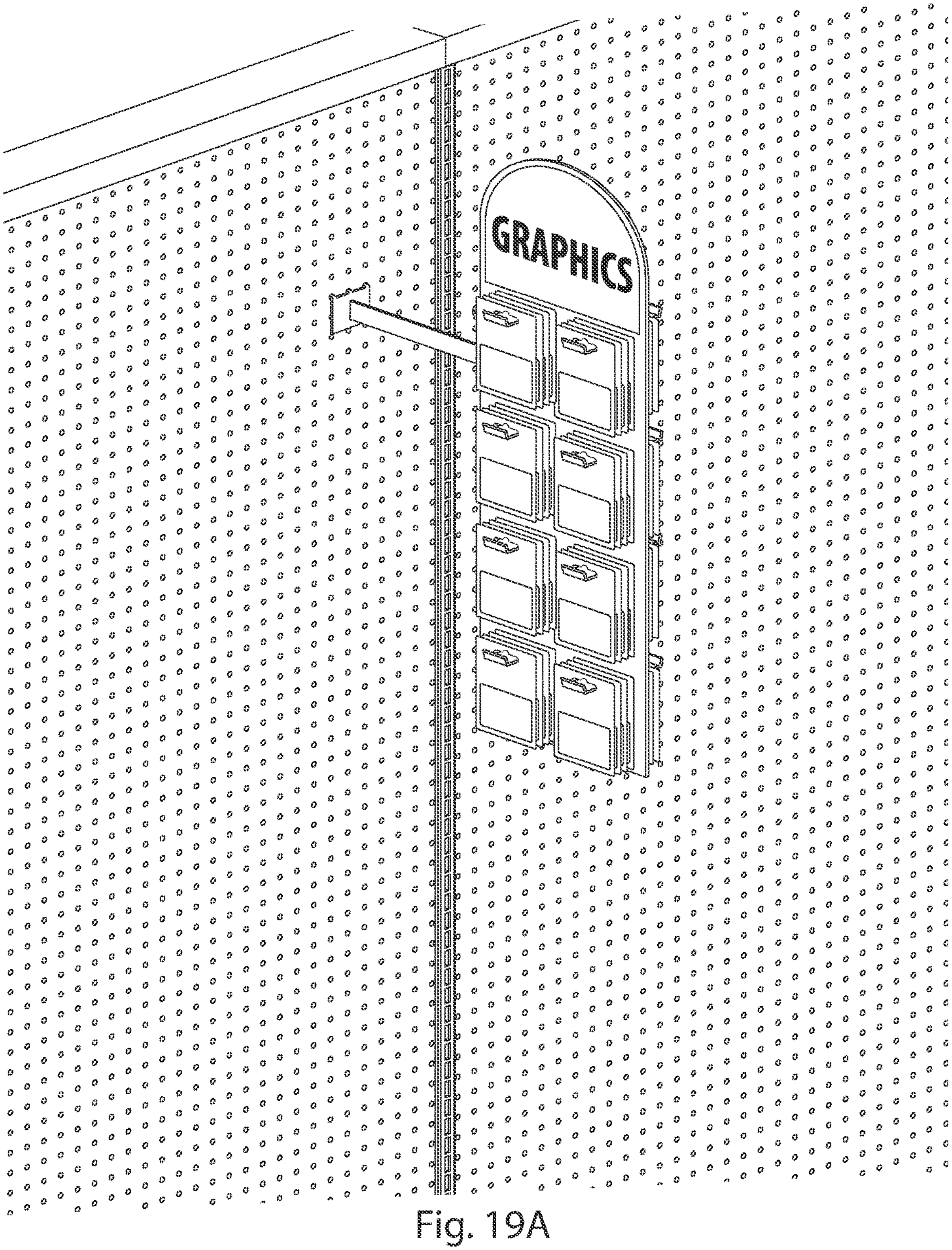
FIG. 19A is a perspective view of the merchandise display assembly of FIG. 19 shown operatively associated with a gondola conventionally carrying a plurality of greeting cards, the merchandise display assembly attached to a pegboard of an upright of the gondola and carrying merchandise for retail display.

Turning to FIGS. 19 and 19A, another merchandise display assembly in accordance with the present teachings is illustrated and generally identified at reference character 1700. The merchandise display assembly 1700 of FIG. 19 is similar to the merchandise display assembly 1700 of FIG. 18, but includes mounting structure for engaging the pegboard 652 of the gondola.

Figure 20:
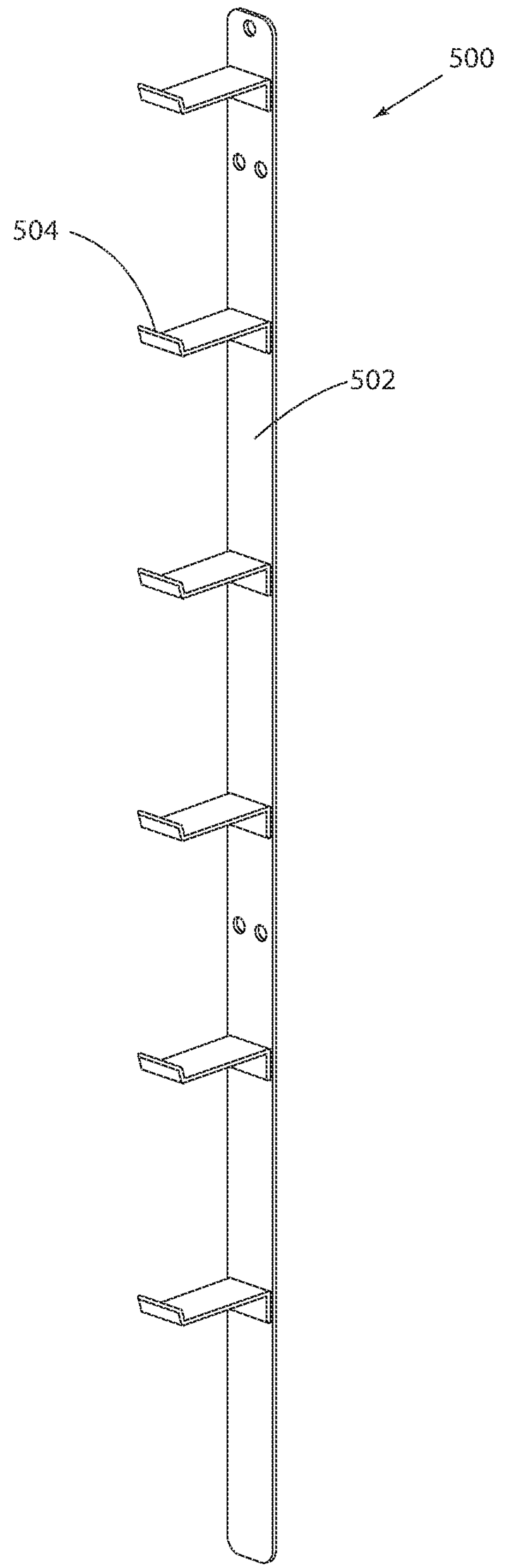
FIG. 20 is a perspective view of another merchandise display assembly in accordance with the present teachings.
Figure 20A:
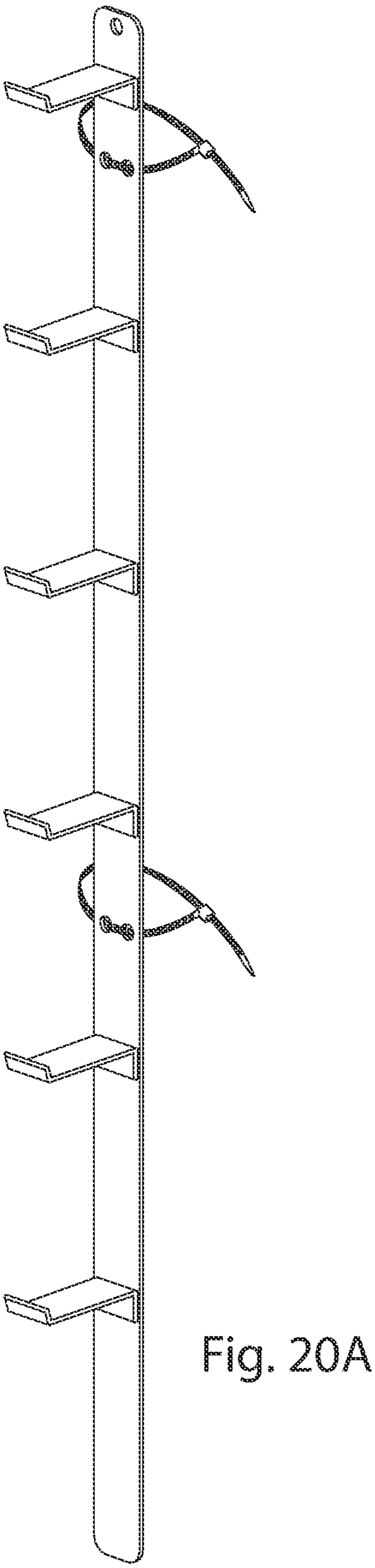
FIG. 20A is a perspective view of the merchandise display assembly of FIG. 20 further shown to include a pair of zip ties for mounting.
Figure 20B:
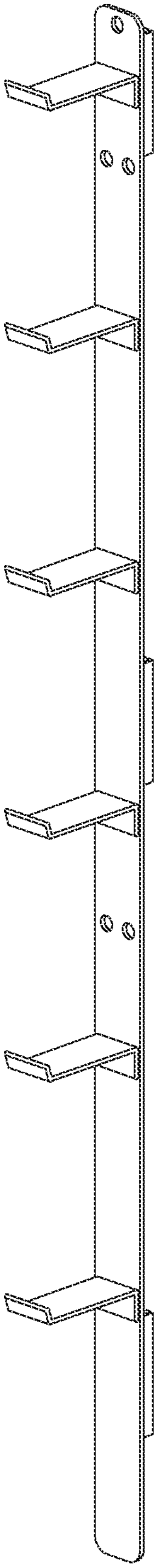
FIG. 20B is a perspective view of the merchandise display assembly of FIG. 20 further shown to include a plurality of magnets for mounting.

Turning to FIGS. 20, 20A and 20B, another merchandise display assembly in accordance with the present teachings is illustrated and generally identified at reference character 500. The merchandise display assembly 500 is illustrated to generally include a planar panel 502 and a plurality of hooks or mounting members 504. In the embodiment illustrated, the panel may be constructed of metal, the hooks may be be constructed of metal, and the hooks may be welded to the panel. As illustrated, the hooks 504 extend from one side of the panel 502. The distal ends of the hooks 504 may include an upwardly extending tip for retaining product thereon until it is desired to remove the product one of the hooks 504. In one application, the merchandise display assembly 500 may be attached to an end cap side rail, for example.

Attachment may be accomplished in any manner well known in the art, including but not limited to fasteners, magnets, zip ties and combinations thereof. As shown in FIG. 20A, the merchandise display assembly 500 is illustrated operatively associated with a plurality of zip ties 506 for attaching the merchandise display assembly 500 to various conventional structures. The zip ties 506 may pass through holes 508 in the panel 502. As shown in FIG. 20B, the merchandise display assembly 500 is illustrated operatively associated with a plurality of magnets 510 for attaching the merchandise display assembly to various conventional structures.

Figure 21:
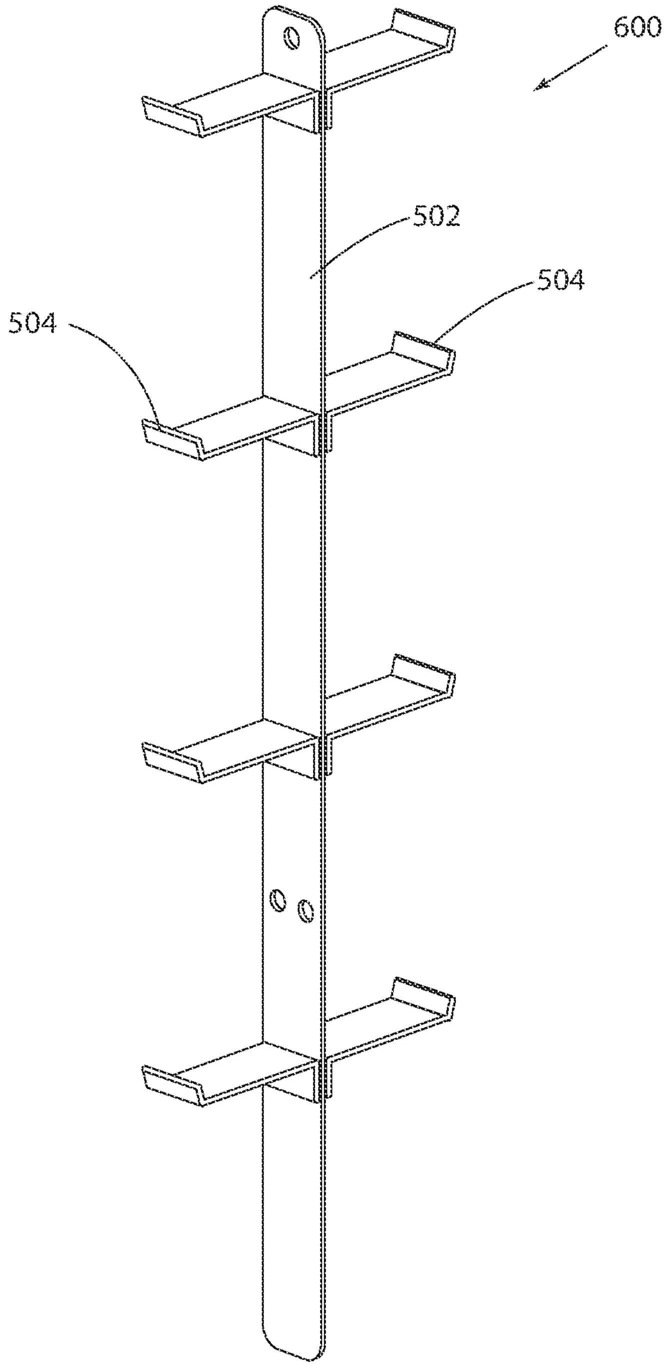
FIG. 21 is a perspective view of another merchandise display assembly in accordance with the present teachings.

Turning to FIGS. 21 and 21A-21C, another merchandise display assembly in accordance with the present teachings is illustrated and generally identified at reference character 600. The merchandise display assembly 600 of FIG. 21 is similar to the merchandise display assembly of FIG. 20. For this reason, the features of the merchandise display assembly 600 of FIG. 21 will be understood to be similar to corresponding features of the merchandise display assembly 500 of FIG. 20 to the extent not otherwise described and common reference characters will be used for similar elements. As shown in FIG. 21, the hooks 504 may extend from both opposite sides of the panel 502.

Figure 21A:
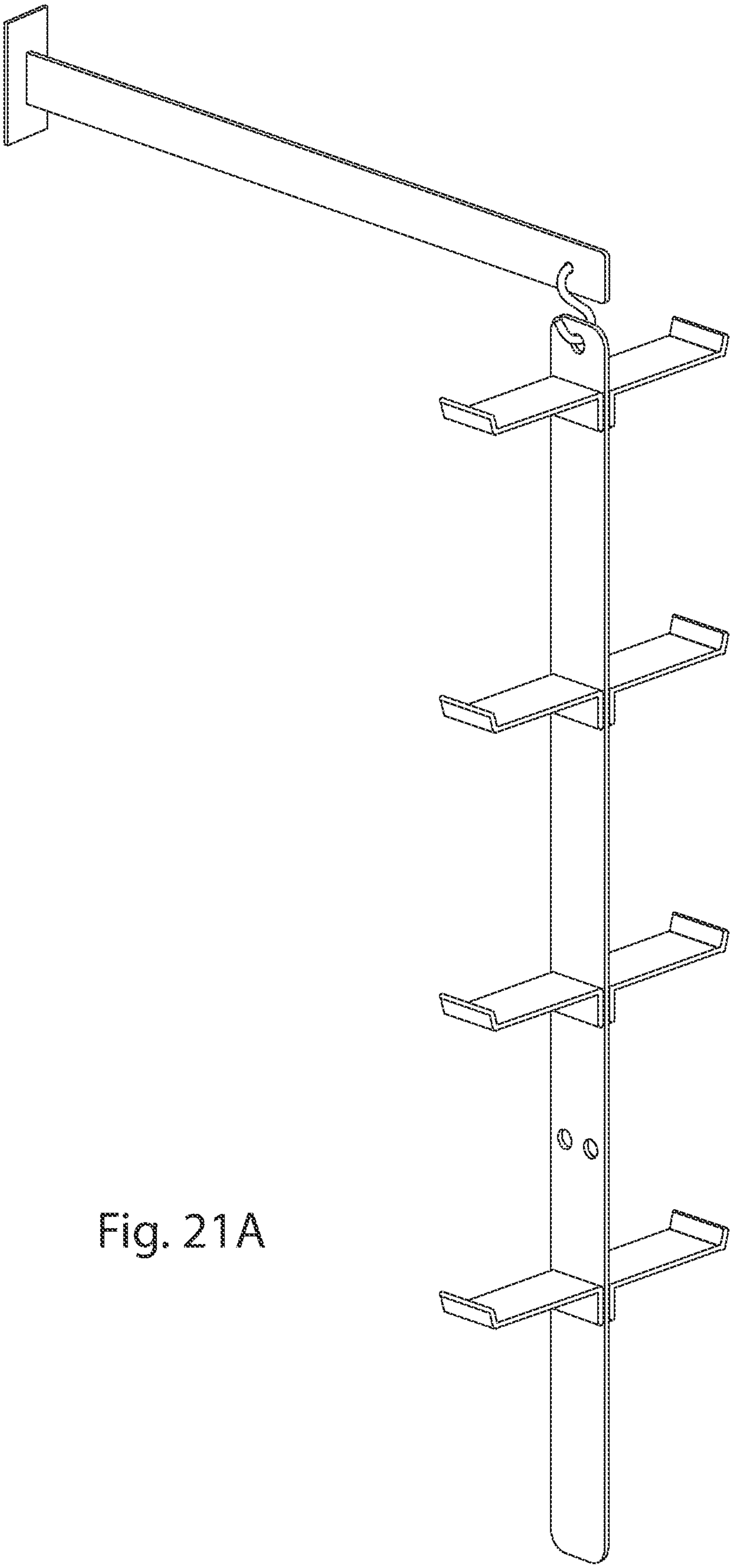
FIG. 21A is a perspective view of the merchandise display assembly of FIG. 21 shown operatively associated with a first mounting arrangement.
Figure 21B:
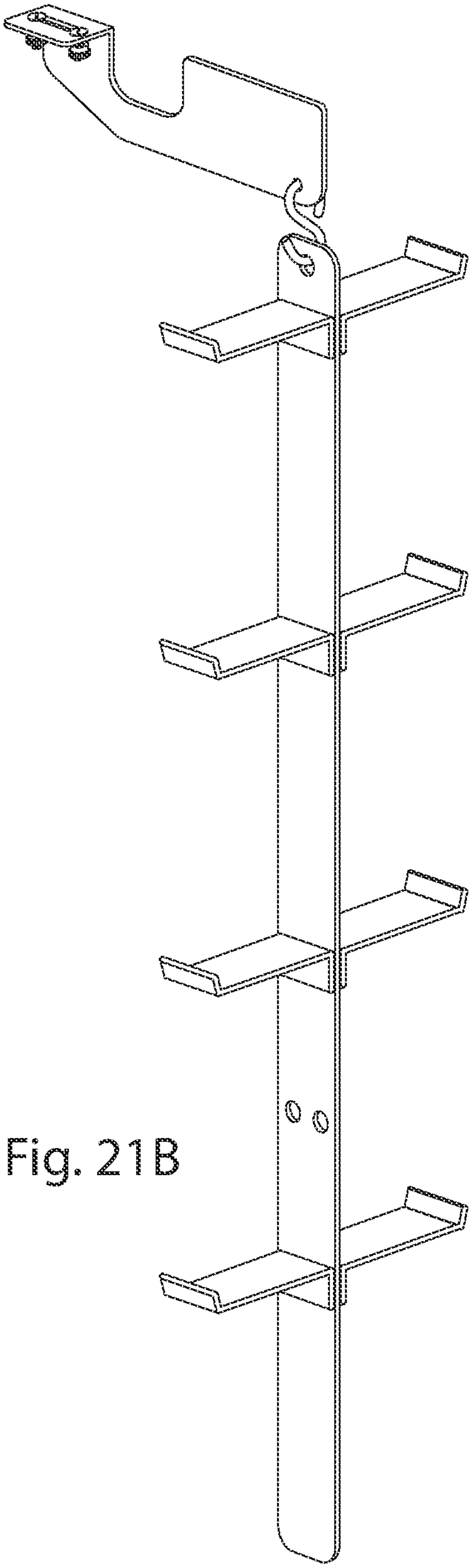
FIG. 21B is a perspective view of the merchandise display assembly of FIG. 21 further shown operatively associated with a second mounting arrangement.
Figure 21C:
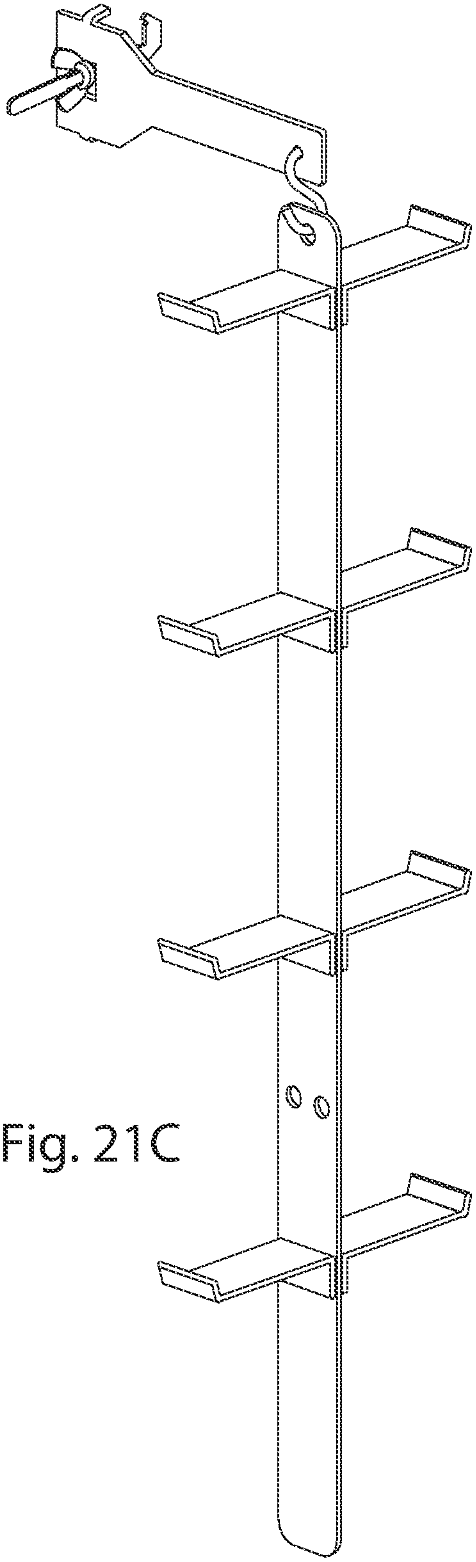
FIG. 21C is a perspective view of the merchandise display assembly of FIG. 21 further shown operatively associated with a second mounting arrangement.

The merchandise display assembly 600 of FIG. 21 may be mounted or suspended in any manner well known in the art. As shown in FIG. 21A, the merchandise display assembly 600 is illustrated operatively associated with a first mounting arrangement 602. The first mounting arrangement 602 includes a mounting arm 603 connected at a distal end to the panel 502 with a hook 604. The opposite or proximal end of the mounting arm 603 is generally illustrated and may be adapted to include any of the mounting structures disclosed herein. In FIG. 21B, the merchandise display assembly 600 is illustrated operatively associated with a second mounting arrangement 610. The second mounting arrangement 610 includes a mounting arm 612 connected at a distal end to the panel 502 with a hook 604. The opposite or proximal end of the mounting arm 612 may be attached to an underside of a shelf. In FIG. 21C, the merchandise display assembly 600 is illustrated operatively associated with a third mounting arrangement 620. The third mounting arrangement 620 includes a mounting arm 622 connected at a distal end to the panel 502 with a hook 604. The opposite or proximal end of the mounting arm 612 may be attached to an upright 110 of a gondola.

While specific examples and alternatives have been described in the specification and illustrated in the drawings, it will be understood by those skilled in the art that various further changes may be made by and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A merchandise assembly for the retail display of goods, the merchandising assembly comprising:

a generally planar member constructed to include a front side, and a rear side and defining a plurality of openings extending therethrough, each opening of the plurality of openings having a rectangular shape;

a merchandising support member suspended by the generally planar member, the merchandising support member monolithically constructed to include a mounting portion and first and second arms extending in opposite directions from the mounting portion, the mounting portion having an inverted U-shape opening in a downward direction, the mounting portion includes an upwardly extending nib at a centerline thereof, the merchandising support member passing through a first opening of the plurality of openings such that a first support member leg of the merchandising support member is adjacent the front side of the generally planar member and a second support member leg of the merchandising support member is adjacent the rear side of the generally planar member, wherein the mounting portion includes first and second downwardly extending legs having a leg thickness that is less than a vertical height of the slots of the generally planar member and a width in a perpendicular direction that is less than a horizontal width of the slots and the mounting portion includes a thickness in a vertical direction at the nib that is nominally greater than a vertical height of the slots such that the mounting portion at the nib vertically fills a gap of the corresponding opening in the panel upon insertion of the merchandising support member, engages the opening in an interference fit, and thereby holds the merchandising support member in place relative to the panel.

2. A method of assembling the merchandise assembly of claim 1, the method comprising:

passing the first arm through one opening of the plurality of openings; and engaging the mounting portion with the panel in an interference fit.

3. A merchandise assembly for the retail display of goods, the merchandising assembly comprising:

a generally planar member constructed to include a front side, and a rear side and defining a plurality of openings extending therethrough, each opening of the plurality of openings having a rectangular shape;

a merchandising support member suspended by the generally planar member, the merchandising support member monolithically constructed to include a mounting portion and first and second arms extending in opposite directions from the mounting portion, the mounting portion having an inverted U-shape opening in a first direction, the mounting portion includes a nib at a centerline thereof extending in a second direction opposite the first direction, the merchandising support member passing through a first opening of the plurality of openings such that a first support member leg of the merchandising support member is adjacent the front side of the generally planar member and a second support member leg of the merchandising support member is adjacent the rear side of the generally planar member, wherein the mounting portion includes first and second downwardly extending legs having a leg thickness that is less than a vertical height of the slots of the generally planar member and a width in a perpendicular direction that is less than a horizontal width of the slots and the mounting portion includes a thickness in a vertical direction at the nib that is nominally greater than a vertical height of the slots such that the mounting portion at the nib vertically fills a gap of the corresponding opening in the panel upon insertion of the merchandising support member, engages the opening in an interference fit, and thereby holds the merchandising support member in place relative to the panel.

4. A merchandise assembly for the retail display of goods, the merchandising assembly comprising:

a generally planar member constructed to include a front side, and a rear side and defining a plurality of openings extending therethrough, each opening of the plurality of openings having a rectangular shape;

a merchandising support member suspended by the generally planar member, the merchandising support member monolithically constructed to include a mounting portion and first and second arms extending in opposite directions from the mounting portion, the mounting portion having an inverted U-shape opening in a first direction, the merchandising support member passing through a first opening of the plurality of openings such that a first support member leg of the merchandising support member is adjacent the front side of the generally planar member and a second support member leg of the merchandising support member is adjacent the rear side of the generally planar member, wherein the mounting portion includes first and second downwardly extending legs having a leg thickness that is less than a vertical height of the slots of the generally planar member and a width in a perpendicular direction that is less than a horizontal width of the slots and the mounting portion includes a thickness in a vertical direction at a centerline thereof that is nominally greater than a vertical height of the slots such that the mounting portion at the centerline vertically fills a gap of the corresponding opening in the panel upon insertion of the merchandising support member, engages the opening in an interference fit, and thereby holds the merchandising support member in place relative to the panel.

* * * * *